United States Patent
Nishida et al.

(10) Patent No.: US 9,926,880 B2
(45) Date of Patent: Mar. 27, 2018

(54) IN-VEHICLE ENGINE CONTROL APPARATUS

(71) Applicant: Mitsubishi Electric Corporation, Tokyo (JP)

(72) Inventors: Mitsunori Nishida, Tokyo (JP); Osamu Nishizawa, Tokyo (JP); Shozo Kanzaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 103 days.

(21) Appl. No.: 15/044,644

(22) Filed: Feb. 16, 2016

(65) Prior Publication Data

US 2017/0089292 A1    Mar. 30, 2017

(30) Foreign Application Priority Data

Sep. 30, 2015   (JP) ................................ 2015-192603

(51) Int. Cl.
    *F02D 41/40*    (2006.01)
    *F02D 35/02*    (2006.01)
    (Continued)

(52) U.S. Cl.
    CPC ........... *F02D 41/402* (2013.01); *F02D 35/02* (2013.01); *F02D 41/20* (2013.01); *F02D 41/22* (2013.01);
    (Continued)

(58) Field of Classification Search
    CPC ........ F02D 41/402; F02D 35/02; F02D 41/20; F02D 41/22; F02D 41/26; F02D 41/401;
    (Continued)

(56) References Cited

U.S. PATENT DOCUMENTS

| 5,430,601 A * | 7/1995 | Burcham ................ F02D 41/20 123/490 |
| 8,776,763 B2 * | 7/2014 | Omori ..................... F02D 41/20 123/445 |
| 2009/0159047 A1 * | 6/2009 | Eto ......................... F02D 41/20 123/435 |

FOREIGN PATENT DOCUMENTS

| JP | 2001-14043 A | 1/2001 |
| JP | 2005-337038 A | 12/2005 |
| JP | 2011-220244 A | 11/2011 |

* cited by examiner

*Primary Examiner* — Joseph Dallo
*Assistant Examiner* — Yi-Kai Wang
(74) *Attorney, Agent, or Firm* — Sughrue Mion, PLLC; Richard C. Turner

(57) ABSTRACT

An in-vehicle engine control apparatus allowing split injection frequency or split injection of fuel while preventing a driving switch element for fuel injecting electromagnetic coils and a boosting switch element for generating a boosted high voltage from being overheated. An operation control circuit portion has reference data of measured environmental temperature vs allowable engine rotational speed with a selected value of the split injection frequency being a parameter, and determines the selected value having, as an upper limit, a split injection frequency which makes the internal temperature of the boosting switch element or a rapidly exciting switch element a predetermined allowable limit value in association with the present environmental temperature detected by an average environmental temperature detection element in a case and the present engine rotational speed detected by an engine rotation sensor.

19 Claims, 12 Drawing Sheets

(51) Int. Cl.
*F02D 41/22* (2006.01)
*F02D 41/26* (2006.01)
*F02M 51/06* (2006.01)
*G01K 13/00* (2006.01)
*F02D 41/20* (2006.01)

(52) U.S. Cl.
CPC ........... *F02D 41/26* (2013.01); *F02D 41/401* (2013.01); *F02M 51/06* (2013.01); *G01K 13/00* (2013.01); *F02D 35/025* (2013.01); *F02D 2041/2065* (2013.01); *F02D 2200/021* (2013.01); *F02D 2200/101* (2013.01); *Y02T 10/44* (2013.01)

(58) Field of Classification Search
CPC ........... F02D 35/025; F02D 2041/2065; F02D 2200/021; F02D 2200/101; F02M 51/06; G01K 13/00; Y02T 10/44
USPC ........................................................ 701/105
See application file for complete search history.

Fig. 5A  INDUCTION ELEMENT — REFERENCE DATA 501 · D1xy

| ENVIRONMENTAL TEMPERATURE T | | -30 | -20 | ... | Tx | ... | 100 | 110 |
|---|---|---|---|---|---|---|---|---|
| ALLOWABLE ROTATIONAL SPEED | SELECT B3 | D111 | D112 | ... | INTERPOLATION N11 | ... | D114 | D115 |
| | SELECT B2 | D121 | D122 | ... | INTERPOLATION N12 | ... | D124 | D125 |
| | SELECT B1 | D131 | D132 | ... | INTERPOLATION N13 | ... | D134 | D135 |

Fig. 5B  BOOSTING SWITCH ELEMENT — REFERENCE DATA 502 · D2xy

| ENVIRONMENTAL TEMPERATURE T | | -30 | -20 | ... | Tx | ... | 100 | 110 |
|---|---|---|---|---|---|---|---|---|
| ALLOWABLE ROTATIONAL SPEED | SELECT B3 | D211 | D212 | ... | INTERPOLATION N21 | ... | D214 | D215 |
| | SELECT B2 | D221 | D222 | ... | INTERPOLATION N22 | ... | D224 | D225 |
| | SELECT B1 | D231 | D232 | ... | INTERPOLATION N23 | ... | D234 | D235 |

Fig. 5C  RAPID EXCITATION SWITCH ELEMENT — REFERENCE DATA 503 · D3xy

| ENVIRONMENTAL TEMPERATURE T | | -30 | -20 | ... | Tx | ... | 100 | 110 |
|---|---|---|---|---|---|---|---|---|
| ALLOWABLE ROTATIONAL SPEED | SELECT B3 | D311 | D312 | ... | INTERPOLATION N31 | ... | D314 | D315 |
| | SELECT B2 | D321 | D322 | ... | INTERPOLATION N32 | ... | D324 | D325 |
| | SELECT B1 | D331 | D332 | ... | INTERPOLATION N33 | ... | D334 | D335 |

Fig. 5D  POWER FEEDING-SUSTAINING SWITCH ELEMENT (AT PREDETERMINED AIR SUCTION AMOUNT) — REFERENCE DATA 504 · D4xy

| ENVIRONMENTAL TEMPERATURE T | | -30 | -20 | ... | Tx | ... | 100 | 110 |
|---|---|---|---|---|---|---|---|---|
| ALLOWABLE ROTATIONAL SPEED | SELECT B3 | D411 | D412 | ... | INTERPOLATION N41 | ... | D414 | D415 |
| | SELECT B2 | D421 | D422 | ... | INTERPOLATION N42 | ... | D424 | D425 |
| | SELECT B1 | D431 | D432 | ... | INTERPOLATION N43 | ... | D434 | D435 |

Fig. 5E  RAPID CUTOFF SWITCH ELEMENT (AT PREDETERMINED AIR SUCTION AMOUNT) — REFERENCE DATA 505 · D5xy

| ENVIRONMENTAL TEMPERATURE T | | -30 | -20 | ... | Tx | ... | 100 | 110 |
|---|---|---|---|---|---|---|---|---|
| ALLOWABLE ROTATIONAL SPEED | SELECT B3 | D511 | D512 | ... | INTERPOLATION N51 | ... | D514 | D515 |
| | SELECT B2 | D521 | D522 | ... | INTERPOLATION N52 | ... | D524 | D525 |
| | SELECT B1 | D531 | D532 | ... | INTERPOLATION N53 | ... | D534 | D535 |

Fig. 5F  COMBINED MONITORED ELEMENT (AT PREDETERMINED AIR SUCTION AMOUNT) — REFERENCE DATA 500 · Dxy

| ENVIRONMENTAL TEMPERATURE T | | -30 | -20 | ... | Tx | ... | 100 | 110 |
|---|---|---|---|---|---|---|---|---|
| ALLOWABLE ROTATIONAL SPEED | SELECT B3 | D11 | D12 | ... | INTERPOLATION N1 | ... | D14 | D15 |
| | SELECT B2 | D21 | D22 | ... | INTERPOLATION N2 | ... | D24 | D25 |
| | SELECT B1 | D31 | D32 | ... | INTERPOLATION N3 | ... | D34 | D35 |

$Dxy = \min(D1xy, D2xy, D3xy, D4xy, D5xy)$

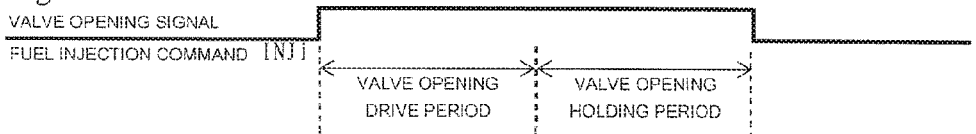

Fig. 9A
VALVE OPENING SIGNAL
FUEL INJECTION COMMAND INJ

VALVE OPENING DRIVE PERIOD | VALVE OPENING HOLDING PERIOD

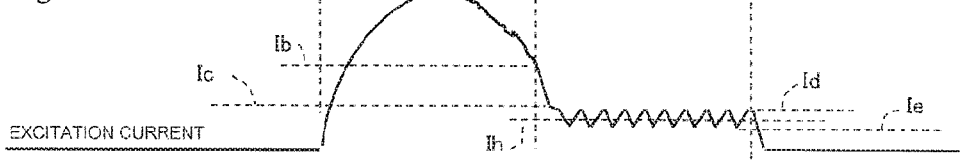

Fig. 9B
EXCITATION CURRENT

Ia, Ib, Ic, Id, Ie, Ih t0, t1, t2, t3

Fig. 9C
BOOSTED HIGH VOLTAGE
Vh1 or Vh2

Vp, CHARGE, DISCHARGE, Vd, Vbmax, Vbmin

Fig. 9D
BOOSTING GATE SIGNAL D
D1 or D2

Fig. 9E
POWER FEEDING GATE SIGNAL A

Fig. 9F
RAPID POWER FEEDING GATE SIGNAL B
B (B1 or B2)

Fig. 9G
CONDUCTION GATE SIGNAL C

Fig. 9H
MEDIATE CAPACITOR-CHARGED VOLTAGE

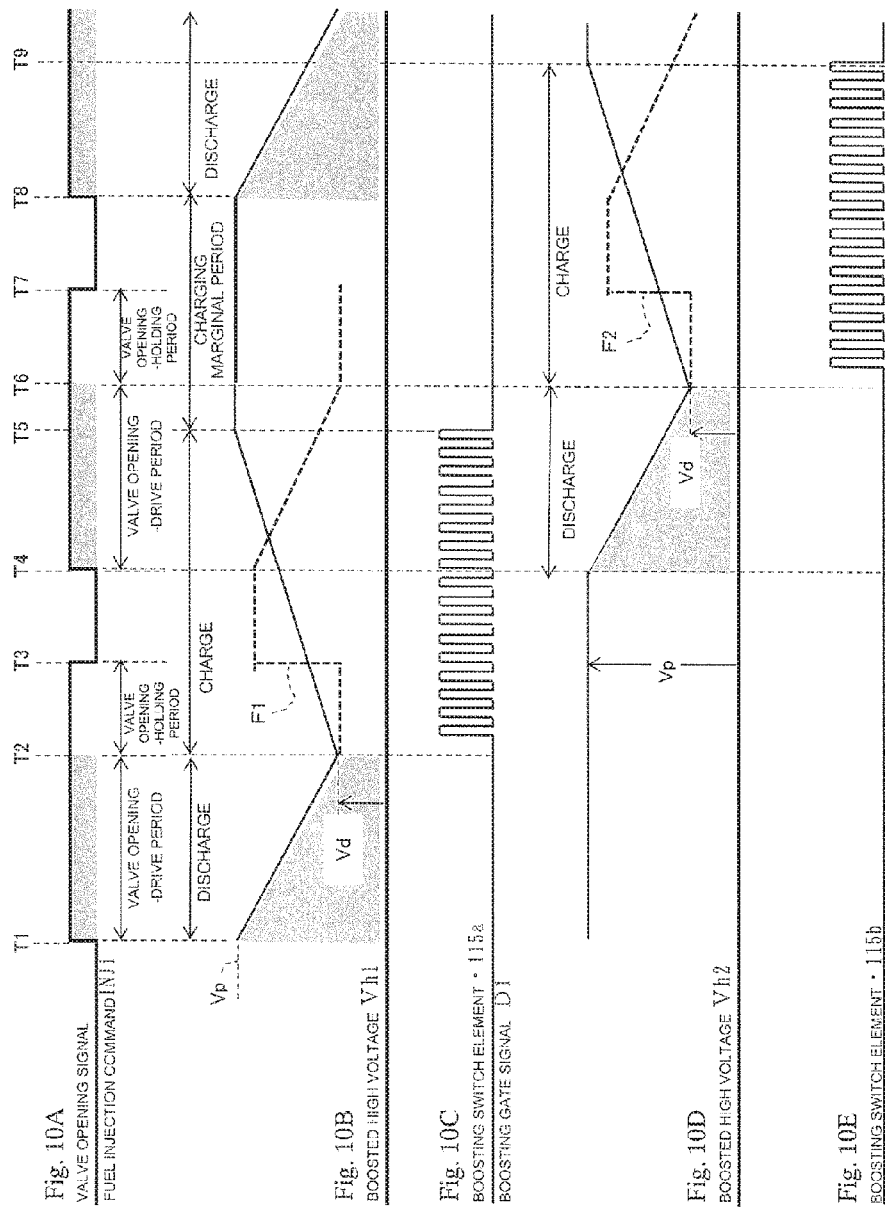

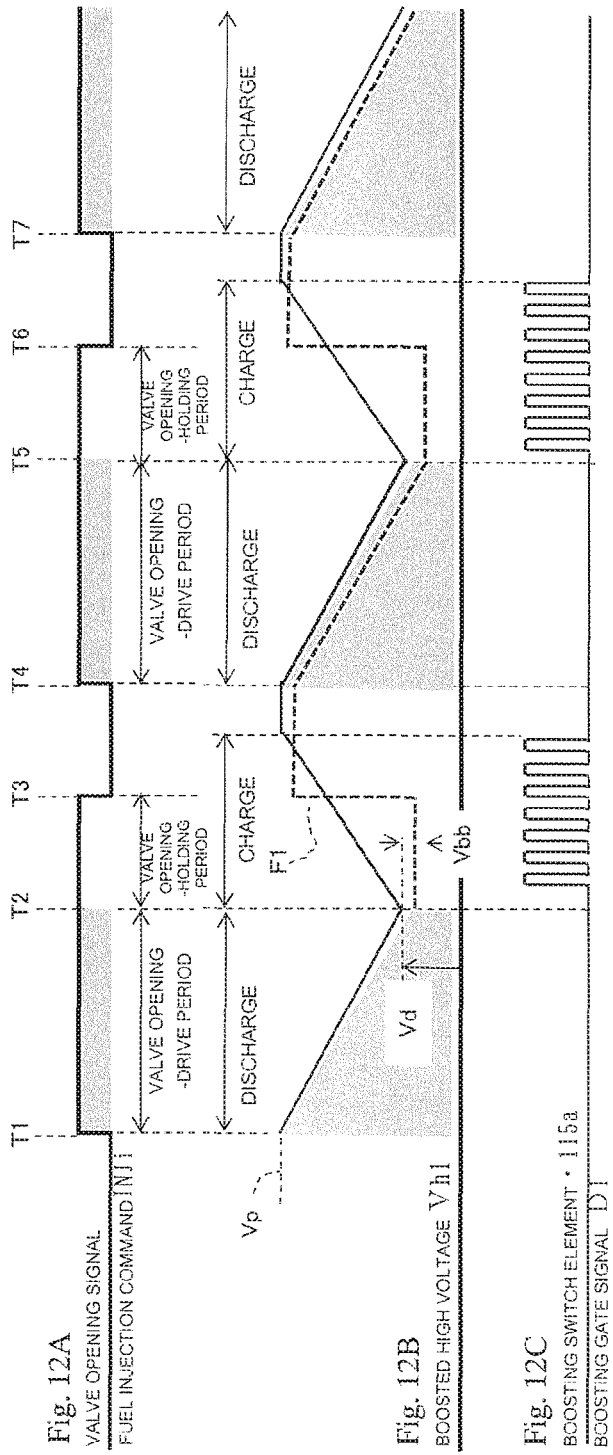

IN-VEHICLE ENGINE CONTROL APPARATUS

BACKGROUND OF THE INVENTION

1. Field of the Invention

The present invention relates to improvements of an in-vehicle engine control apparatus in which multiple fuel injections, i.e. fuel injections of plural times are performed to the same cylinder in one combustion cycle period of an internal combustion engine, and in particular to an in-vehicle engine control apparatus in which a temperature rise of a fuel injection control portion following such multiple fuel injections is suppressed.

2. Description of the Related Art

A fuel injection type multi-cylinder engine includes a collective injection type which performs the fuel injection once in one combustion cycle period of each cylinder, a split (divided) injection type which performs the fuel injection of the same amount as a whole by multiple split injections, or an intermittent split type which alternately repeats the collective injection and the split injection, in order to improve vehicle exhaust emission measures and fuel efficiency depending on the load condition.

It is to be noted that split injection mentioned herein includes a variety of injection types, for example from a split injection type of two steps or stages composed of a former injection in the inlet stroke and a latter injection in the compression stroke to a split injection type of five steps at maximum composed of a pilot injection in the compression stroke; a pre-injection, a main injection, and an after-injection in the explosion stroke; and a post injection in the exhaust stroke.

For instance, "Fuel injection control apparatus" of Japanese Patent Laid-Open Publication 2005-337038 (hereafter, referred to as Patent Document 1) is, as shown in FIGS. 3, 4, and 8) provided with a thermistor 41 for detecting an ambient temperature Ta of FETs 35-37 between the charging FET 35 (boosting switch element mentioned in this patent application) for generating a boosted high voltage, the separating FET 36 (rapid excitation switch element mentioned in this patent application) for applying a boosted high voltage to a plurality of injectors 20, and the constant current FET 37 (power feeding-sustaining switch element mentioned this patent application) for feeding power to the injectors 20 from a battery power supply. In addition, a temperature difference between the ambient temperature Ta and a junction temperature Tj of the FETs 35-37 when operated on the severest condition is preliminarily calculated and stored, which is added this to the actual ambient temperature Ta, thereby calculating the maximum junction temperature Tjmax. When this exceeds a predetermined temperature (e.g. 150 degrees C.) for determining an overheat state, the number of split step (five steps at maximum) of the split injection is reduced, thereby suppressing such a temperature rise.

According to FIG. 10 and the descriptions of Paras. [0055], [0056], it is described that the thermistor 41 is preferably provided in close vicinity of a heatsink of MOS-FET, that is a part to be measured, to measure the ambient temperature Ta at the nearest position, thereby reducing a calculation error of the junction temperature.

In the descriptions, four cylinder FETs (rapid cutoff switch element mentioned in this patent application) for four cylinder engine, four separating FETs 36 (rapid excitation switch element mentioned in this patent application), two constant current FETs 37 (power feeding-sustaining switch element mentioned in this patent application) by cylinder group, and two charging FETs 35 (boosting switch element mentioned in this patent application) for each cylinder group are used.

While two separating FETs 36 and one charging FET 35 are generally used, Patent Document 1 uses four separating FETs 36 and two charging FETs 35 to disperse the heat generated, where a connecting circuit arrangement of the four separating FETs 36 and the two charging FETs 35 is not disclosed.

Also, Japanese Patent Laid-Open Publication 2011-220244 (hereafter, referred to as Patent Document 2) describes "Fuel injection control apparatus" in FIG. 4 such that based on the in-apparatus temperature T detected by the thermistor or the engine rotational speed N, all of injection controls A-D are allowed to be performed when the detected temperature is equal to or less than T11 or the rotational speed is equal to or less than N11; either the control B or the control D which is larger in the heat generation amount is allowed to be performed when the detected temperature is between T1–T12 (T12>T11) or the rotational speed is between N11–N12 (N12>N11); or only the control A and the control C are allowed to be performed with the control B and the control D prohibited to be performed when the detected temperature exceeds T12 or the rotational speed exceeds N12, for suppressing the in-apparatus temperature.

The control A mentioned therein is a fuel injection control having a long valve opening command period which includes a rapid power feeding period of a large current and a valve opening-holding period of a small current as shown in FIG. 2(A), and the control B is a fuel injection control having a short valve opening command period which includes only a rapid power feeding period of a large current as shown in FIG. 2(B).

The control C is a fuel injection control enabling a fuel injection once in one combustion cycle period of the engine as shown in FIG. 3(A), and the control D is a fuel injection control enabling the split injection twice as shown in FIG. 3(B).

Para. [0038] of Patent Document 2 describes that the heat amount generated in the injector driving circuit 22 by the control D for performing multiple fuel injections is larger than that by the control C as is obvious.

Para. [0036] of Patent Document 2 describes that the heat amount generated in the injector driving circuit 22 by the control B which cuts off a large current is larger than that by the control A.

However, the valve opening command period for the injector increases in proportion to the inlet air amount responsive to the depressing degree of acceleration pedal and decreases in reverse proportion to the engine rotational speed. Therefore, in case where the fuel injection amount required is small, requiring no valve opening-holding period, and the power feeding is stopped immediately after the rapid power feeding current has attenuated, the heat amount generated in the injector driving circuit 22 by the control B is apparently smaller than that by control A, so that it is not simply possible to specify what level of attenuation cutoff current would make the control B more disadvantageous.

Since even though the power feeding is stopped during the rapid power feeding period of a large current, the generated heat amount will not increase if the attenuation is made by a commutation circuit or power is collected by a capacitor, generally there is a contradiction that it cannot be said that the generated heat amount by the control B is simply larger than that by the control A.

Also, "Driving apparatus for electromagnetic load" of Japanese Patent Laid-Open Publication 2001-14043 (hereafter, referred to as Patent Document 3) related to the thermal control according to this patent application comprises, as shown in FIG. 1, a boosting circuit mainly composed of an inductor L11, a transistor T00, an oscillating circuit 100, and capacitors C10, C20 for rapidly exciting injector solenoids 101a-104a. This apparatus is disclosed as one example of a regenerative charging system in which the counter electromotive force energy generated in the solenoids 101a-104a at the time of electrical conduction cutoff is collected by diodes D10-D40 and accumulated by the capacitors C10, C20 for the reduction of power loss, where ECU 200 is adapted to monitor the voltage of the capacitors C10, C20 at the time of electrical conduction cutoff of the solenoids 101a-104a and adjust the electrical conduction cutoff timing even though the voltage is varied, thereby stabilizing the valve opening characteristics.

(1) Explanation of Prior Art Problem

"Fuel injection control apparatus" according to the above Patent Document 1 is provided with the thermistor 41 for detecting the ambient temperature Ta at the nearest position of the FET that is a switch element to be thermally monitored and restricts the number of injection steps or stages so that the junction temperature of the switch element which is estimated from the ambient temperature Ta may become a predetermined temperature or less.

However, the fuel injection control apparatus is generally installed in the engine room, so that it is necessary to assume the temperature inside the engine room to be 120 degrees C. at the maximum while in order to make the temperature of the junction portion of the semiconductor element below e.g. 175 degrees C. or less, it is necessary to control the temperature of the heatsink portion representing the inside temperature of the semiconductor element to 150 degrees C. or less.

Therefore, there is a problem that the internal temperature rise allowed for the switch element in the inside of the fuel injection control apparatus becomes 20-30 degrees C. or less, and that even though the temperature at the nearest position of the switch element is detected, its distribution between the environmental temperature and the temperature rise due to the self-heat generation is not detected, so that the temperature rise component of the switch element cannot be accurately controlled, and that even if the temperature rise is actually much smaller, a control only with a margin based on the highest temperature rise for the worst condition scenario.

It is to be noted that Patent Document 1 is adapted to disperse the generated heat by using the four separating FETs 36 (rapid excitation switch element mentioned in this patent application), and that for this purpose, it is necessary to connect eight positive and negative terminals in total of the four solenoids 101a-104a to the driving circuit 100. Therefore, there is a problem that the cost and the vehicle weight increase as the number of external wirings increases, and that the contact reliability is lowered due to the increase of pin number of connector, and an occurrence probability of disconnection/short-circuit a ground fault contacting the ground circuit of external wirings, or an abnormal sky fault connection thereof with the positive side wiring of the power supply grows.

Also, in "Fuel injection control apparatus" according to the above Patent Document 2, thermal information acquiring means that indicates the thermal sensor or the engine rotational speed used therein is not specified as to acquiring the temperature of which portion in the inside of the fuel injection control apparatus and which switch element in the driving circuit is focused is not specified as well.

Therefore, there is a problem that while if the engine rotational speed is assumed to be acquired by thermal information acquiring means, the temperature rise of e.g. the boosting switch element can be estimated from the engine rotational speed, but the temperature of the boosting switch element itself cannot be estimated if the environmental temperature is not known.

Also, there is a problem that even though the engine rotational speed is determined, the temperature rise itself of the switch element which supplies the valve opening-holding current cannot be estimated.

Also, there is a problem that if the thermal sensor is made a thermal information acquiring means and if the thermal sensor detects the temperature of the nearest position of the heat generated element, the distinction between the environmental temperature and the temperature rise due to the self-generated heat cannot be made, so that if it is provided at a position far from the heat generated element, the temperature of the heat generated element itself cannot be estimated.

While FIG. 5 of Patent Document 2 determines an applicable control mode with a dual map of the detected temperature by the thermal sensor and the engine rotational speed upon attending to the above problem, a plurality of switch elements in the driving circuits are not individually focused, so that individual accurate determination cannot be made and only a general determination having a certain margin can be done.

On the other hand, there is a problem that in "Driving apparatus of electromagnetic load" according to the above Patent Document 3, the number of use of the power feeding-sustaining switch elements T11, T21, the rapid excitation switch elements T12, T22, and the boosting switch element 100 is fewer than the number of use of the rapid cutoff switch elements T10-T40, sharing a plurality of solenoids, so that the power loss is concentrated and the temperature rise of the local part becomes excessive.

Also, there is a problem that while the regenerative charging system for suppressing the temperature rise of the rapid cutoff switch elements T10-T40 and the boosting switch element T100 is applied, complicated adjusting means for stabilizing the valve opening characteristics is required.

Also, as seen from FIG. 2, since the transistors T13, T23 in the boosting circuit are connected by cylinder group, the capacitors C10, C20 cannot be alternately used with the same solenoid, resulting in the arrangement of concentrating the generated heat to the single boosting element T100 and the single inductor L11.

SUMMARY OF THE INVENTION (2) Explanation of Purpose of the Invention

The first object of the present invention is to provide an engine control apparatus in which the thermal control of switch elements for driving control with respect to a plurality of electromagnetic coils which drive fuel injection electromagnetic valves and boosting switch elements in a boosting control circuit portion which generates a boosted high voltage for a high speed drive is accurately carried out, thereby increasing the split injection frequency or enhancing the engine rotational speed enabling the split injection.

The second object of the present invention is to provide an engine control apparatus in which the concentration of excessive temperature rise in a specified switch element is avoided, thereby increasing the split injection frequency or enhancing the engine rotational speed enabling the split injection.

An in-apparatus vehicle engine control apparatus according to the present first invention for sequentially driving a fuel injection electromagnetic valve provided for each cylinder of a multi-cylinder engine, comprising:

a drive control circuit portion including a plurality of switch elements for alternately and sequentially driving a plurality of electromagnetic coils for driving the electromagnetic valves to be opened, for each of a first cylinder group and a second cylinder group, a boosting control circuit portion which generates a boosted high voltage for rapidly exciting the electromagnetic coils, and an operation control circuit portion mainly composed of a microprocessor and a program memory, wherein the boosting control circuit portion includes one or more induction elements intermittently excited by one or more boosting switch elements from an in-vehicle battery, and one or more high-voltage capacitors charged to a boosted high voltage as a target through multiple intermittent operations by electromagnetic energy accumulated in the induction elements being discharged when the boosting switch element is opened, and the drive control circuit portion includes a power feeding-sustaining switch element connected individually or for each cylinder group through a backflow prevention element between the in-vehicle battery and the electromagnetic coils, a rapid excitation switch element connected individually or for each cylinder group between the high-voltage capacitor 114a and the electromagnetic coils, a commutation circuit element connected individually or for each cylinder group in parallel with the electromagnetic coils, and a rapid cutoff switch element individually connected in series with the electromagnetic coil or the commutation circuit element.

The operation control circuit portion further includes fuel injection command means which provides a fuel injection command to the plural switch elements, a control program forming split upper limit designating means which designates an upper limit value of a selected value for designating how many times the fuel injection command signal should be provided to the same electromagnetic coil during one combustion cycle period of each engine in the multi-cylinder engine, and a reference data which is a data table or an approximated calculation, the reference data is an aggregation of reference data respectively related to a plurality of elements to be monitored, in which the reference data includes the selected value limited by the split upper limit designating means as a mediate parameter, and is composed of minimum values edited of numerical data of allowable engine rotational speed determined by a detected environmental temperature, as a parameter, detected by an environmental temperature detection element and related to installation environments of the elements to be monitored, representing any of the induction element, the boosting switch element, the rapid excitation switch element, the power feeding-sustaining switch element, and the rapid cutoff switch element, the allowable engine rotation speed is statistic data obtained by experimentally confirming that the internal temperature of the elements to be monitored becomes equal to or less than a predetermined allowable limit temperature even in case of a continuous operation with multiple injections by applying the selected value designated to the measured environmental temperature, and the split upper limit designating means determines the selected value having a higher split injection frequency as an upper limit within an allowable range by comparing an engine rotational speed Ne detected by an engine rotation sensor and a value of the allowable engine rotational speed with respect to the measured environmental temperature at present calculated by an interpolation operation from the reference data.

The operation control circuit portion according to the present second invention further includes a control program forming split upper limit designating means which designates an upper limit value of a selected value for determining how many times the fuel injection command signal should be provided to the same electromagnetic coil during one combustion cycle period of each engine in the multi-cylinder engine, and a reference data which is a data table or an approximated calculation, edited by collecting experimental data related to the plural monitored elements, the split upper limit designating means designates the selected value having a possible higher split injection frequency as an upper limit within an allowable range, on a condition that an internal temperature of the monitored elements becomes equal to or below a predetermined allowable limit value, in association with a measured environmental temperature at present detected by an environmental temperature detection element, an allowable rotational speed of engine calculated from the reference data, and an allowable rotational speed of engine at present detected by an engine rotational speed sensor, and further including loss suppressing means or heat generation dispersing means for suppressing a temperature rise of a part of the switch elements provided within the boosting control circuit and the drive control circuit portion.

As described above, the in-vehicle engine control apparatus according to the first invention of this invention comprises a driving control circuit portion for a plurality of electromagnetic coils for fuel injection, a boosting circuit portion which generates a boosted high voltage for a rapid excitation, and an operation control circuit portion which generates one or more fuel injection commands for the same electromagnetic coil, the operation control circuit portion having reference data of environmental temperature vs allowable engine rotational speed with a selected value of split injection frequency being made a medium parameter, and a control program forming split upper limit designating means. The split upper limit designating means designates a selected value of a largest possible split injection frequency as an upper limit on a condition that the internal temperature of the element to be monitored has a predetermined allowable limit value or less, in relation to the present environmental temperature detected by the environmental temperature detection element, an allowable engine rotational speed calculated from the reference data, and the present engine rotational speed detected by the rotation sensor.

Accordingly, in such an environmental temperature that the present engine rotational speed is low, the temperature rise of the element to be monitored is low, and no problem resides in the internal temperature, the combustion characteristics of fuel can be improved by increasing the split injection frequency.

The value of the allowable split injection frequency is based on statistic data preliminarily obtained from experimental measurements by a plurality of in-vehicle engine control apparatuses, requiring no estimation of the internal temperature of the element to be monitored during real machine operations, and a plurality of elements to be monitored can be collectively monitored, so that the control load of the microprocessor can be advantageously reduced.

Also, the in-vehicle engine control apparatus according to the second invention of this invention comprises a drive control circuit portion for a plurality of electromagnetic coils for fuel injection, a boosting circuit portion which generates a boosted high voltage for a rapid excitation, and an operation control circuit portion which generates one or more fuel injection commands for the same electromagnetic coil during one combustion cycle of the engine, wherein the operation control circuit portion comprises reference data of environmental temperature vs allowable engine rotational speed with a selected value of the split injection frequency being made a medium parameter and a control program forming split upper limit designating means, this split upper limit designating means designates a selected value of a largest possible split injection frequency as the upper limit on a condition that the internal temperature of the element to be monitored has a predetermined allowable limit value or less, in relation to the present environmental temperature detected by the environmental temperature detection element, an allowable engine rotational speed calculated from the reference data, and the present engine rotational speed detected by the rotation sensor, and to at least a part of the switch elements provided within the boosting control circuit portion and the drive control circuit portion, lost suppressing means or generated heat dispersing means for suppressing the temperature rise is added.

Therefore, it is advantageous that in case a specific switch element becomes excessively higher in temperature than other switch elements, the temperature suppressing means for the specific switch elements is added improve the combustion characteristic of fuel by making the split injection frequency higher.

Also, the value of the allowable split injection frequency is based on statistic data preliminarily obtained from experimental measurements by a plurality of in-vehicle engine control apparatuses, requiring no estimation of the internal temperature of the element to be monitored during real machine operations, and a plurality of elements to be monitored can be collectively monitored, so that the control load of the microprocessor can be advantageously reduced.

BRIEF DESCRIPTION OF THE DRAWINGS

In the accompanying drawings:

FIGS. 5A-5F is a data table diagram of reference data used in the apparatus shown in FIG. 1;

FIGS. 9A-9H is a first time chart for firstly explaining the operations of the apparatus shown in FIG. 8;

FIGS. 10A-10E is a second time chart for secondly explaining the operations of the apparatus shown in FIG. 8;

FIGS. 12A-12C is a time chart for explaining the operations of the apparatus shown in FIG. 11.

DETAILED DESCRIPTION OF THE PREFERRED EMBODIMENT

In the following, preferred embodiments of an in-vehicle engine control apparatus according to the present invention will be described, referring to the attached drawings.

Embodiment 1

(1) Detailed Description of Arrangement

Figure 1:
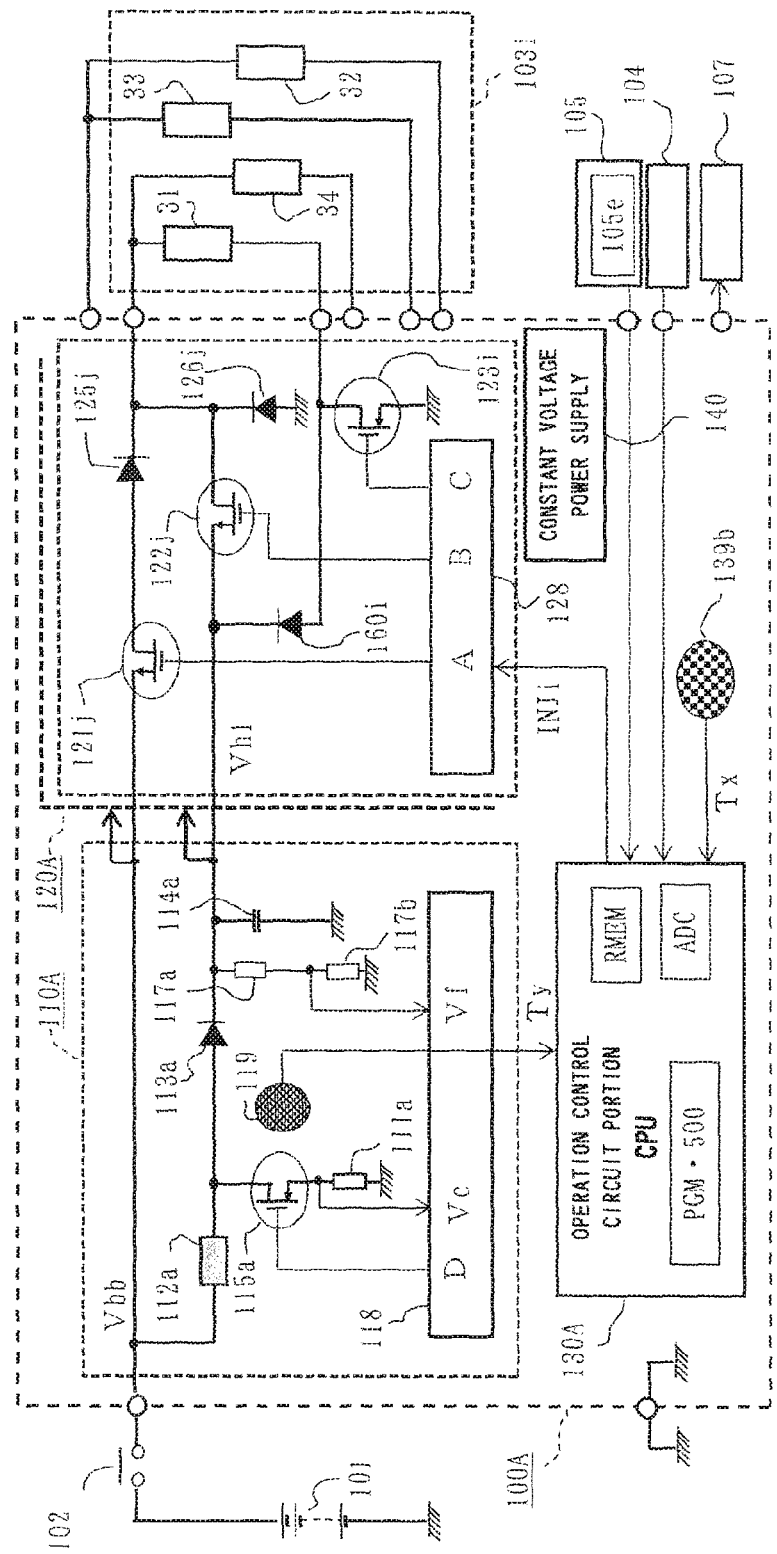
FIG. 1 is a diagram of an entire electric circuit of an in-vehicle engine control apparatus according to Embodiment 1 of the present invention.

Firstly, an arrangement of FIG. 1 showing an entire electric circuit of an in-vehicle engine control apparatus according to Embodiment 1 of the present invention will be described.

In FIG. 1, an in-vehicle engine control apparatus 100A is mainly composed of a drive control circuit portion 120A for electromagnetic coils 103$i$ (hereinafter, occasionally referred to as electromagnetic coil 103$i$ in a singular form) of fuel injection electromagnetic valves provided in association with cylinder numbers i=1, 2, m of a multi-cylinder engine, a boosting control circuit portion 110A forming a high voltage power supply for rapidly exciting the electromagnetic coils 31-34, and an operation control circuit portion 30A composed of an integrated circuit element of one chip or two chips together with the boosting control circuit portion 110A, and a constant voltage power supply 140 for supplying a predetermined stabilized voltage to each control circuit portion.

An in-vehicle battery 101 which is connected to the outside of the in-vehicle engine control apparatus 100A supplies a power supply voltage Vbb to the in-vehicle engine control apparatus 100A through an output contact of a power supply relay 102.

It is to be noted that the power supply relay 102 is activated by a power source switch (not shown) being closed and deactivated in a predetermined delay time by the power source switch being opened.

A Random Access Memory RAM memory RMEM as will be mentioned later is adapted to receive minute power from the in-vehicle battery 101 immediately through a power supply circuit (not shown).

An analog sensor group 104 is composed of analog sensors for driving control of the engine such as an accelerator position sensor for detecting the depression degree of the accelerator pedal; a throttle position sensor for detecting the valve opening of an inlet throttle; an air flow sensor for detecting an inlet air amount for the engine; a fuel pressure sensor for injecting fuel; an exhaust gas sensor for detecting oxygen density of exhaust gas; and a cooling water temperature sensor of the engine (in case of a water-cooled engine).

A switch sensor group 105 includes an engine rotation sensor 105$e$ for detecting the engine rotational speed and besides a switch sensor such as a crank angle sensor for determining fuel injection timing and a vehicle speed sensor for detecting the vehicle speed; and a manually operated switch such as an accelerator pedal switch, a brake pedal switch, a parking brake switch, and a shift switch for detecting the shift lever position of the transmission.

An electric load group 107 (not shown) driven by the in-vehicle engine control apparatus 100A is composed of electric loads of a main machinery such as an ignition coil (in case of gasoline engine) and an inlet valve opening-controlling motor, and of accessory equipment such as a heater for an exhaust gas sensor, a power supply relay for load power supply, an electromagnetic clutch for air conditioner drive, and alarm/display equipment.

The electromagnetic coil 103$i$ that is a specific electric load among the electric load group 107 serves to drive the fuel injection electromagnetic valve with respect to the cylinder number i, in which the electromagnetic coils 31-34 indicate the case of a four cylinder engine.

It is to be noted that in case of a straight-four engine, the electromagnetic coils 31,34 provided in association with the cylinder arrangement's order 1-4 include a first group formed of the electromagnetic coils 31-34 for the cylinders 1, 4 arranged outside and a second group formed of the electromagnetic coils 33, 32 for the cylinders 3, 2 arranged inside, in which the fuel injection is performed in the circulated order of e.g. electromagnetic coil 31→electromagnetic coil 33→electromagnetic coil 34→electromagnetic coil 32→electromagnetic coil 31, where the electromagnetic coils 31, 34 of the first group and the electric magnetic coils 33, 32 of the second group alternately perform the fuel injection to reduce the vehicle body oscillation.

Even in case of a straight-six engine or a straight-eight engine, by performing alternate fuel injections with the electromagnetic coils divided into the first and the second groups, the vehicle body oscillation can be reduced and the valve opening command signals for the electromagnetic coils within the same group cannot be mutually overlapped on a time basis.

In the inside arrangement of the in-vehicle engine control apparatus 100A, the operation control circuit portion 130A comprises a microprocessor CPU, the RAM memory RMEM for calculations, a nonvolatile program memory PGM that is e.g. a flash memory, and a multi-channel A/D converter ADC of a sequential conversion type which converts an analog input signal of 16 channels into a digital signal, in which the program memory PRG includes reference data 500 mentioned later referring to FIG. 5.

It is to be noted that the program memory PGM can be electrically and collectively erased by block, in which a part of the blocks is used as a nonvolatile data memory to store important data inside the RAM memory RMEM.

The constant voltage power supply 140 is fed with power from the in-vehicle battery 101 through the output contact of the power supply relay 102, generates a stabilized voltage of e.g. DC 5V or DC 3.3V to be fed to the operation control circuit portion 130, and generates a backup power supply of e.g. 2.8 V for storing the data in the RAM memory RMEM by the direct power feeding from the in-vehicle battery 101.

The boosting control circuit 110A supplied with the power supply voltage Vbb through the output contact of the power supply relay 102 from the in-vehicle battery 101 is mainly composed of a serial circuit of an induction element 112$a$, a charging diode 113$a$, and a high voltage capacitor 114A and a serial circuit of a boosting switch element 115$a$ and a current detection register 111$a$ collected across the induction element 112$a$ and the ground circuit. When the boosting switch element 115$a$ is closed or switched on so that the current flowing through the induction element 112$a$ exceeds a predetermined value, the boosting switch element 115$a$ is opened or switched off, so that the electromagnetic energy accumulated in the induction element 112$a$ is discharged to the high voltage capacitor 114$a$ through the charging diode 113$a$, where by switching the boosting switch element 115$a$ plural times, the boosted high voltage Vh1, i.e. that is a charged voltage of the high voltage capacitor 114$a$ rises up to a predetermined voltage as a target of e.g. DC 72V.

The terminal voltage across the current detection register 111$a$ is applied to a feedback control circuit 18 as a feedback current signal Vc.

An adjacent temperature detection element 119 detects the temperature of the nearest position of the boosting switch element 115$a$ and applies a signal voltage to the microprocessor CPU as a measured adjacent temperature Ty.

The terminal voltage across the high voltage capacitor 114$a$ is divided by voltage dividing registers 117$a$, 117$b$ to be applied to the feedback control circuit 118 as a feedback voltage signal Vf.

When the feedback current signal Vc is below a second predetermined threshold value, the feedback control circuit 118 generates a boosting gate signal D to drive the boosting switch element 115$a$ to close the circuit or to be switched on. As the current flowing through the induction element 112$a$ is accordingly increased and the feedback current signal Vc exceeds the second threshold value, the boosting gate signal D is stopped so that the boosting switch element 115$a$ is deactivated and switched off. When a predetermined period lapses after the deactivation and switch-off so that the charging current to the high voltage capacitor 114$a$ from the induction element 112$a$ becomes a predetermined value or less, the boosting gate signal D is again generated. Hereafter, the same switching control operation will be repeated.

When the feedback voltage signal Vf is below a predetermined voltage somewhat lower than a divided voltage of the boosting high voltage Vh1 as a target, the feedback control circuit 118 enables the boosting gate signal D to be generated and the boosting switch element 115$a$ to be driven to close the circuit or switched on. When the charging voltage of the high voltage capacitor 114$a$ is accordingly increased so as to exceed the targeted boosted high voltage Vh, the feedback control circuit 118 stops the generation of the boosting gate signal D, thereby performing such a hysteresis operation as the boosting switch element 115$a$ is not driven to close the circuit.

The drive control circuit portion 120A is composed of a serial circuit of a power feeding-sustaining switch element 121$j$ and a backflow prevention element 125$j$ for applying the power supply voltage Vbb to a common terminal of the electromagnetic coils 31, 34 of the first group, a rapid excitation switch element 122$j$ for applying the boosted high voltage Vh1, a rapid cutoff (shutoff) switch element 123$i$ individually provided on the downstream side of the electromagnetic coils 31, 34, and a commutation circuit element 126$j$ provided between the common terminal and the ground circuit.

In this case, j indicates a group number where j=1, and i indicates a cylinder number where i=1 or 4.

Also, to the electromagnetic coils 33, 32 of the second group, the power feeding-sustaining switch element 121$j$, the backflow prevention element 125$j$, the rapid excitation switch element 122$j$, the rapid cutoff switch element 123$i$, and the commutation circuit element 126$j$ are connected where j=2, and i=2 or 3.

The gate control circuit 128 receives a fuel injection command INJi from the operation control circuit portion 130A, generating a power feeding gate signal A for the power feeding-sustaining switch element 121$j$, a rapid power feeding gate signal B for the rapid excitation switch element 122*j*, and a conduction gate signal C for the rapid cutoff switch element 123*i*, thereby driving the corresponding switch elements to close the circuit.

It is to be noted that the fuel injection command INJi is a signal generated at a predetermined timing by the crank angle sensor and stopped after a predetermined fuel injection period. In this fuel injection period, the power feeding-sustaining switch element 121*j* and the rapid cutoff switch element 123*i* corresponding to the cylinder which is an object for the fuel injection are driven to close the circuit, while the rapid excitation switch element 122*j* is driven to close the circuit in a short time period from the occurrence of the fuel injection command INJi to the time when the excitation current of the electromagnetic coil 103*i* selected reaches a predetermined excitation current. Then, the excitation current of the electromagnetic coil 103*i* is held at a valve opening-holding current during the power feeding-sustaining switch element 121*j* being intermittently operated. In case where the power feeding-sustaining switch element 121*j* is intermittently opened or switched off and the rapid cutoff switch element 123*i* is held to close the circuit, current at the time of opening the circuit returns to flow through the commutation circuit element 126*j*.

When the power feeding-sustaining switch element 121*j* and the rapid cutoff switch element 123*i* are opened, the valve opening-holding current having been flowing through the electromagnetic coil 31 or the electromagnetic coil 34 flows into the high voltage capacitor 114*a* through a collection diode 116*i*, so that the excitation current is to be rapidly cut off.

It is to be noted that for performing the determination of the rapid excitation current and the valve opening-holding current control, the electromagnetic coil 103*i* is provided with a current detection register (not shown) by group, and the detection signal of the excitation current is inputted to the gate control circuit 128.

Also, an environmental temperature detection element 139 as will be described referring to FIG. 2 detects the environmental temperature within the in-vehicle engine control apparatus 100A and gives a signal voltage to a microprocessor CPU as a measured environmental temperature Tx.

Then, FIG. 2 which is a layout figure of an arrangement of the temperature detection element of the apparatus shown in FIG. 1 will be described.

Figure 2:
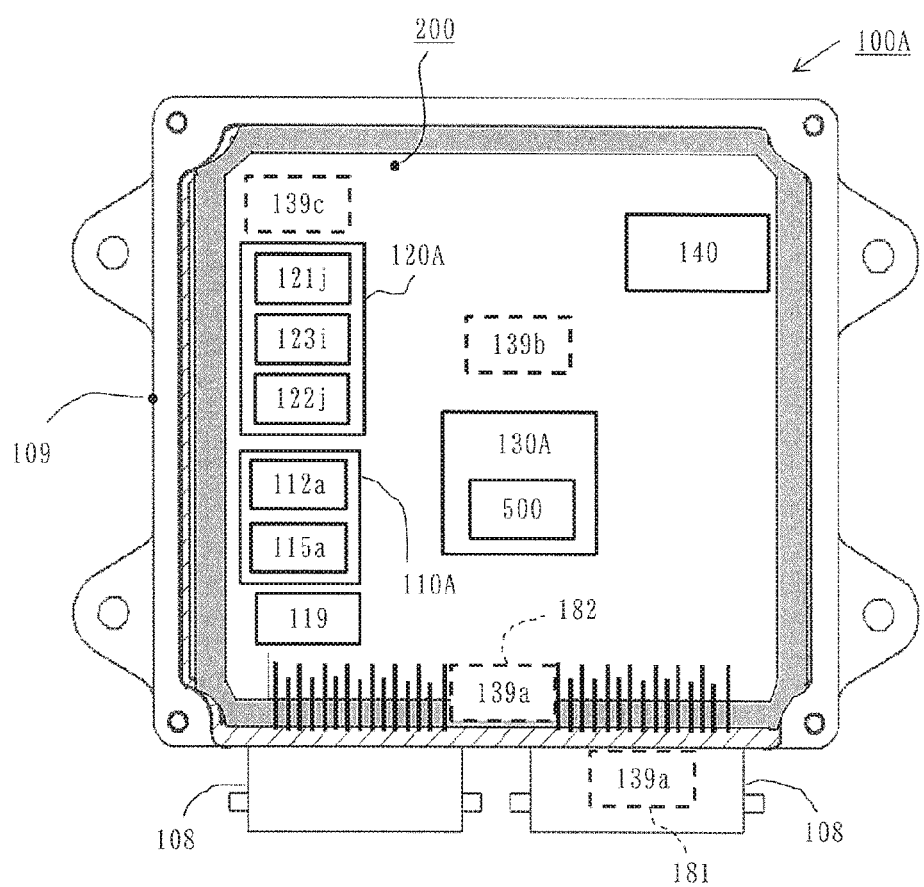
FIG. 2 is a diagram showing a layout of a thermal detection element shown in FIG. 1.

In FIG. 2, the in-vehicle engine control apparatus 100A comprises a circuit substrate 200 stored in a sealed manner in a case 109 formed of a base and a cover. A part of a pair or input/output connectors 108, 108 mounted on the circuit substrate 200 is exposed outside the case 109, to which a wire harness for external wiring (not shown) is adapted to be connected.

As main heat generating parts mounted on the circuit substrate 200, an integrated circuit element in the operation control circuit portion 130A arranged in a far center vicinity of the circuit substrate 200; a plurality of transistors generating stabilized voltages of e.g. DC 5V and DC 3.3V from the constant voltage power supply 140 arranged in the right side; the boosting switch element 115*a* and the induction element 112*a* in the boosting control circuit portion 110A arranged on the left side; two rapid excitation switch elements 122*j* in the drive control circuit portion 120A, four power feeding-sustaining switch elements 121*j*; four rapid cutoff switch elements 123*i*; and the like, are mentioned. In addition, a number of input registers in an input interface circuit (not shown) are mounted on the right side position.

The adjacent temperature detection element 119 is provided at a position adjacent to the boosting switch element 115*a* in the boosting control circuit portion 110A to directly detect the presence/absence of an abnormal overheat of the boosting switch element 115*a* for abnormality alarm.

A low environmental detection element 139*a* provided at a first setting position 181 which is in the inside of any one of the pair of input/output connectors 108, 108, or at a second setting position 182 which is in a middle position of the pair of input/output connectors 108, 108 is set outside or inside the case 109 to measure the setting environmental temperature. For being mounted on the circuit substrate 200 for convenience sake of wiring, it is mounted on the circuit substrate 200 at a place not adjacent to high heat-generating parts including monitored elements, in a temperature distribution area of which temperature is lower than an average temperature related to the temperature distribution at least of the case 109.

It is to be noted that this low environmental temperature detection element 139*a* measures the environmental temperature Ta of the induction element 112*a*, the boosting switch element 115*a*, or the rapid excitation switch element 122*j* as a monitored element, which is made the measured environmental temperature Tx common to each switch element.

The ones occasionally called as specific monitored elements among the monitored elements mentioned herein are elements of which consumed power increases in proportion to the fuel injection frequency per second. These elements are for valve opening drive operations of the fuel injection electromagnetic valves and are directly influenced as to the split injection frequency, where it is not related to the valve opening-holding operation.

On the contrary, the power feeding-sustaining switch element 121*j* and the rapid cutoff switch element 123*i* which are not specific monitored elements have consumed power increasing in proportion to the fuel injection amount required per second and so have the fuel injection frequency per second influenced as well, mainly performing the valve opening-holding operation and also being involved in the valve opening drive operation.

It is to be noted that if the rapid cutoff switch element 123*i* is a type of absorbing the electromagnetic energy when the valve opening-holding current is cut off or shut off, its consumed power is largely influenced by the fuel injection frequency per second, whereas if it is a regenerative charging type for the high voltage capacitor 114*a* as shown in FIG. 1, it is less influenced by the fuel injection frequency.

However, through the rapid cutoff switch element 123*i* and the power feeding-sustaining switch element 121*j*, large current at the valve opening drive time temporarily flows or attenuating current after the valve opening drive time temporarily flows, so that the influence of the valve opening drive operation cannot be neglected.

On the other hand, a high environmental temperature detection element 139*c* is provided adjacent to the power feeding-sustaining switch element 121*j*, whereby the temperature of the power feeding-sustaining switch element 121*j* can be directly monitored, and the average value of the temperature detected by the high environmental temperature detection element 139*c* and the temperature detected by the low environmental temperature detection element 139*a* is calculated and used as the measured environmental temperature Tx common to each switch element.

The average environmental temperature detection element 139*b* is a temperature detection element mounted on a place in which the environmental temperature corresponding to the average temperature of the temperature detected by the low environmental temperature detection element 139a and the temperature detected by the high environmental temperature detection element 139c is detected, being used instead of the low environmental temperature detection element 139a and the high environmental temperature detection element 139c.

Figure 7:
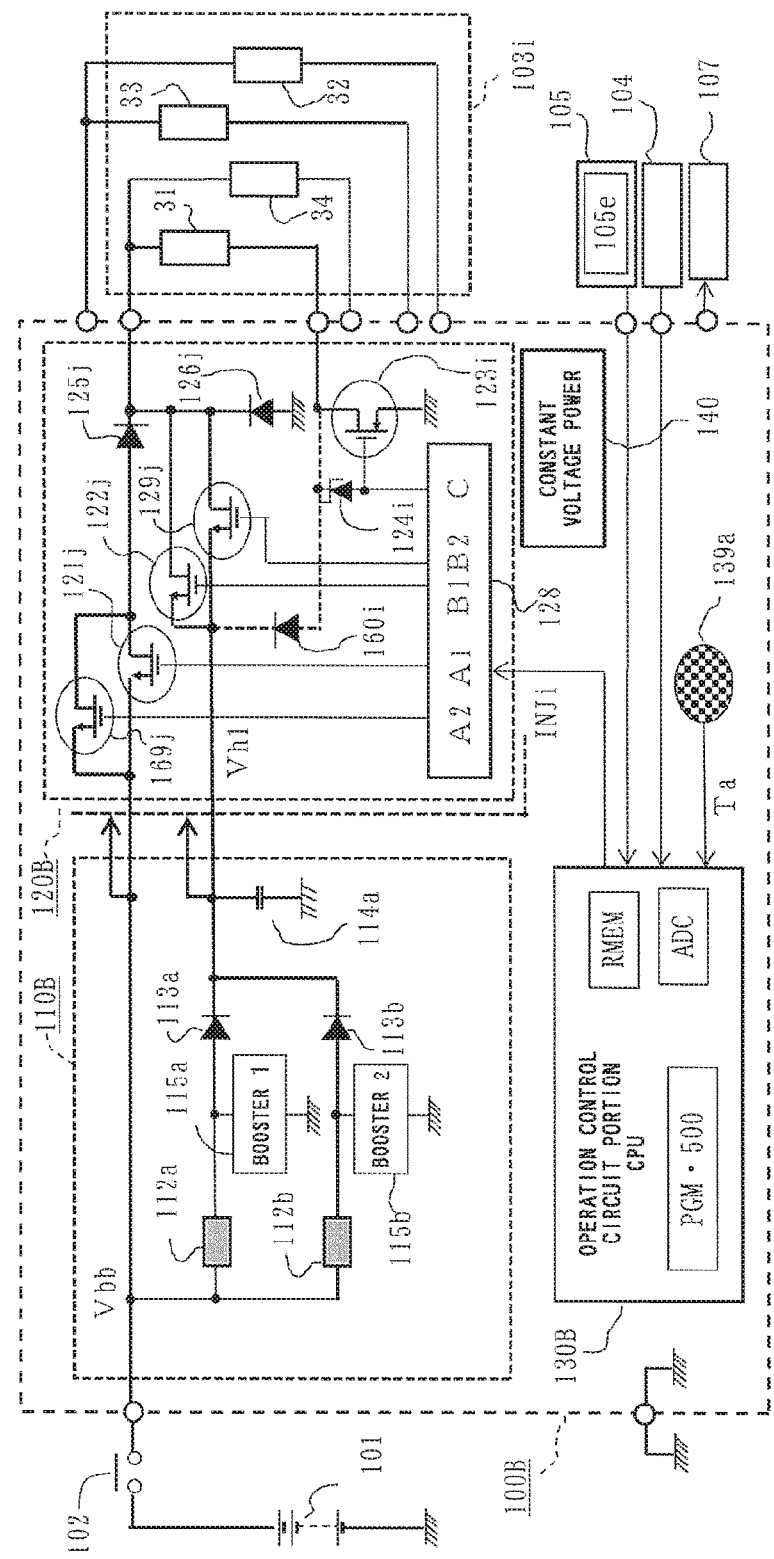
FIG. 7 is a diagram of an entire electric circuit of an in-vehicle engine control apparatus according to Embodiment 2 of the present invention.
Figure 8:
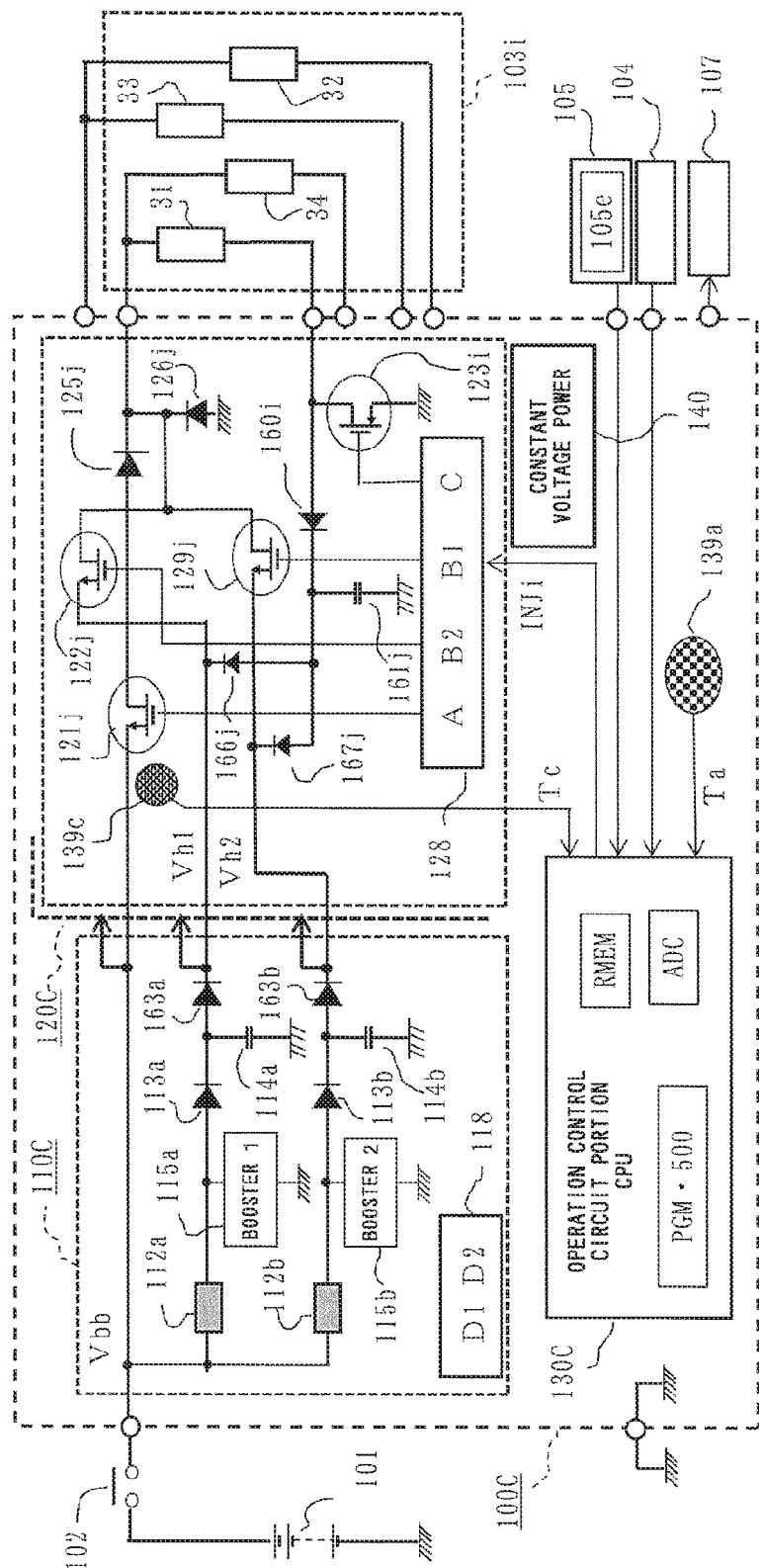
FIG. 8 is a diagram of an entire electric circuit of an in-vehicle engine control apparatus according to Embodiment 3 of the present invention.
Figure 11:
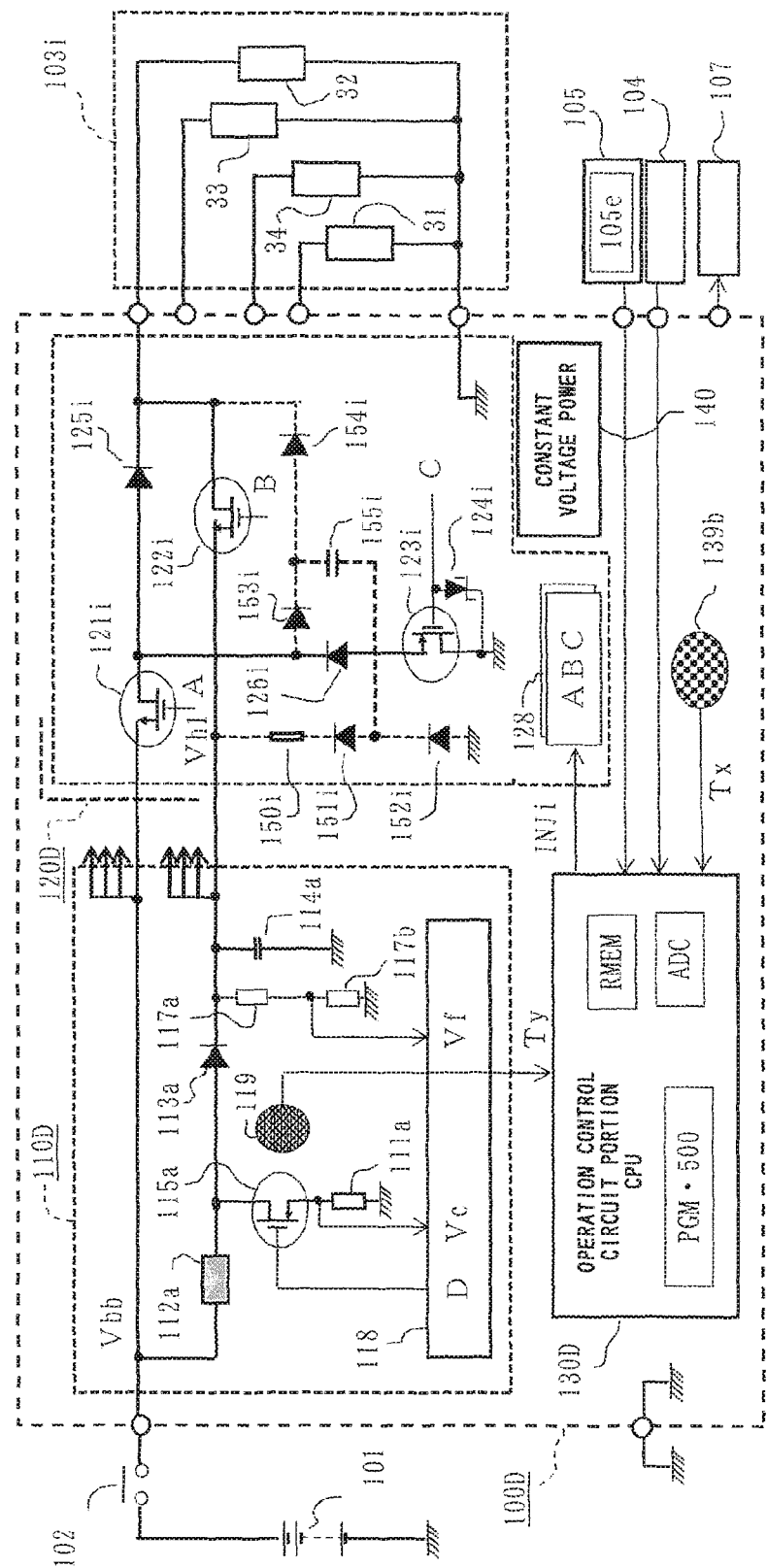
FIG. 11 is a diagram of an entire electric circuit of an in-vehicle engine control apparatus according to Embodiment 4 of the present invention.

It is to be noted that while Embodiment 1 shown in FIG. 1 uses the average environmental temperature detection element 139b, Embodiment 2 shown in FIG. 7 uses the low environmental temperature detection element 139a, Embodiment 3 shown in FIG. 8 uses the low environmental temperature detection element 139a together with a high environmental temperature detection element 139c to calculate the average temperature, and Embodiment 4 shown in FIG. 11 uses the average environmental temperature detection element 139b in the same as FIG. 1.

In another Embodiment in which an average temperature of the temperature Ta detected by the low environmental temperature detection element 139a and the temperature Tc detected by the high environmental temperature detection element 139c is calculated and used as the measured environmental temperature Tx common to each switch element, a calculation coefficient of the average temperature is varied depending on the moving average value (e.g. average value for 10 seconds) of the inlet air amount indicating the load state of the engine; and in a high load state, by amending the temperature on the side close to the high environmental temperature detection element 139c to the measured environmental temperature Tx, even though predetermined inlet air amounts shown in FIGS. 5D and 5E as will be described are fixed to an inlet air amount in a middle load state, a higher precise determination can be made.

(2) Detailed Explanation of Effect and Operation

Detailed explanation of effect and operation of the in-vehicle engine control apparatus according to Embodiment 1 of the present invention arranged as shown in FIGS. 1 and 2 will be described referring to FIGS. 3A-3H which are time charts for describing the operation of the apparatus shown in FIG. 1, FIG. 4 which is a characteristic curve diagram related to an allowable rotational speed of the engine of the apparatus shown in FIG. 1, and FIGS. 5A-5F which are data table charts forming the reference data 500 in the apparatus shown in FIG. 1.

Firstly in FIG. 1, when the power switch (not shown) is closed, the output contact of the power supply relay 102 is closed to apply the power supply voltage Vbb to the in-vehicle engine control apparatus 100A.

As a result, the constant power supply 140 generates stabilized voltages of e.g. DC 5V and DC 3.3V to start the control operation of the microprocessor CPU.

The microprocessor CPU generates a load drive command signal for the electric load group 107 in response to the operation condition of the switch sensor group 105 and the analog sensor group 104 as well as the contents of the control program stored in the nonvolatile program memory PRG, and generates a fuel injection command INJi to the electromagnetic coils 31-34 which are the specific electric loads among the electric load group 107 through the drive control circuit portion 120A.

On the other hand, the boosting control circuit portion 110A has the high voltage capacitor 114a charged to a boosted high voltage Vh1 as a target by intermittently operating or switching the boosting switch element 115a on/off.

While in a period for which the fuel injection command INJi is generated, any one of the pair of power feeding-sustaining switch element 121j (j=1 or 2) and any one of the four rapid cutoff switch elements 123i (i=1-4) are driven to close the circuit; during a short time period immediately after the fuel infection command INJi has been generated, any one of the pair of rapid excitation switch elements 122j (j=1 or 2) is driven to close the circuit. The rapid excitation switch element 122j rapidly excites one of the electromagnetic coils 103i (i=1-4) as a fuel injection target of this time by using the boosted high voltage Vh1, and then the power feeding-sustaining switch element 121j intermittently connects the power supply voltage Vbb, thereby supplying the valve opening-holding current. The rapid cutoff switch element 123i rapidly cuts off the electromagnetic coil 103i when the fuel injection command INJi is stopped. At this time, the electromagnetic energy stored in the electromagnetic coil 103i is charged to the high voltage capacitor 114a in a regenerative manner through the collection diode 160i.

It is to be noted that in this Embodiment 1, the high voltage capacitor 114a has repeated operations such that in a time period from the time immediately after the power supply switch (not shown) is closed to the time when the fuel injection is started by the engine being rotated with a starter motor, the boosted high voltage Vh is initially charged to a boosted maximum voltage Vp=DC 72V, is then discharged to e.g. the discharged-attenuated voltage Vd=DC 66V by a fuel injection of one time, and then is again charged to the boosted maximum voltage Vp by the next fuel injection time by the boosting switch element 115a being again intermittently operated.

Therefore, the high voltage capacitor 114a always maintains a high voltage of DC 72-66V, so that the current attenuation characteristics of the electromagnetic coil 103i when the rapid cutoff switch element 123i is opened is stabilized, preventing the valve closing timing from being varied.

It is to be noted that since each switch element switches a field effect transistor having a small internal resistance and a minute closed-circuit voltage on/off, the theoretical consumed power generated in the transistor takes a value of (open-circuit voltage)*(leakage current at open circuit)+(closed-circuit voltage)*(conduction current), so that the leakage current at the open-circuit time is minute and the closed circuit voltage at the closed-circuit time is minute, resulting in a minute power loss.

However, the switching action is not actually made momentarily, generating a transient power loss due to an open-circuit voltage and a conduction current in the opened/closed circuit transitional process.

The induction element 112a and the boosting switch element 115a are used to sequentially drive the four electromagnetic coils 103i at a high speed and recharge the high voltage capacitor 114a through several tens of intermittent operations every time a single high speed drive of the electromagnetic coil 103i is made, realizing the severest switch element in aspect of heat generation.

Therefore, in the system of a multistep split injection of 3-5 steps, it is necessary to restrict the engine rotational speed to the one where at least multistep split injection can be made by e.g. splitting or dividing the boosting switch element 115a and the induction element 112a by group.

The rapid excitation switch element 122j is advantageous over the boosting switch element 115a in the aspect of heat generation because while being applied with the boosted high voltage Vh1 for dealing with a large current, the element 122*j* is provided by the cylinder group, and needs only a single switching operation with respect to a single fuel injection.

While the power feeding-sustaining switch element 121*j* has a temporarily large current flowing therethrough but attenuated, the applied voltage is the power source voltage Vbb, the valve opening-holding current is small, and it is provided by the cylinder group, so that it is advantageous over the boosting switch element 115*a* in the aspect of heat generation.

If being adapted to absorb the electromagnetic energy accumulated at the electromagnetic coil 103*i* at the cutoff time, the rapid cutoff switch element 123*i* has a high temperature rise due to a split injection but is individually connected to each electromagnetic coil 103*i*, so that it is advantageous over the boosting switch element 115*a* in the aspect of heat generation.

Figure 3:
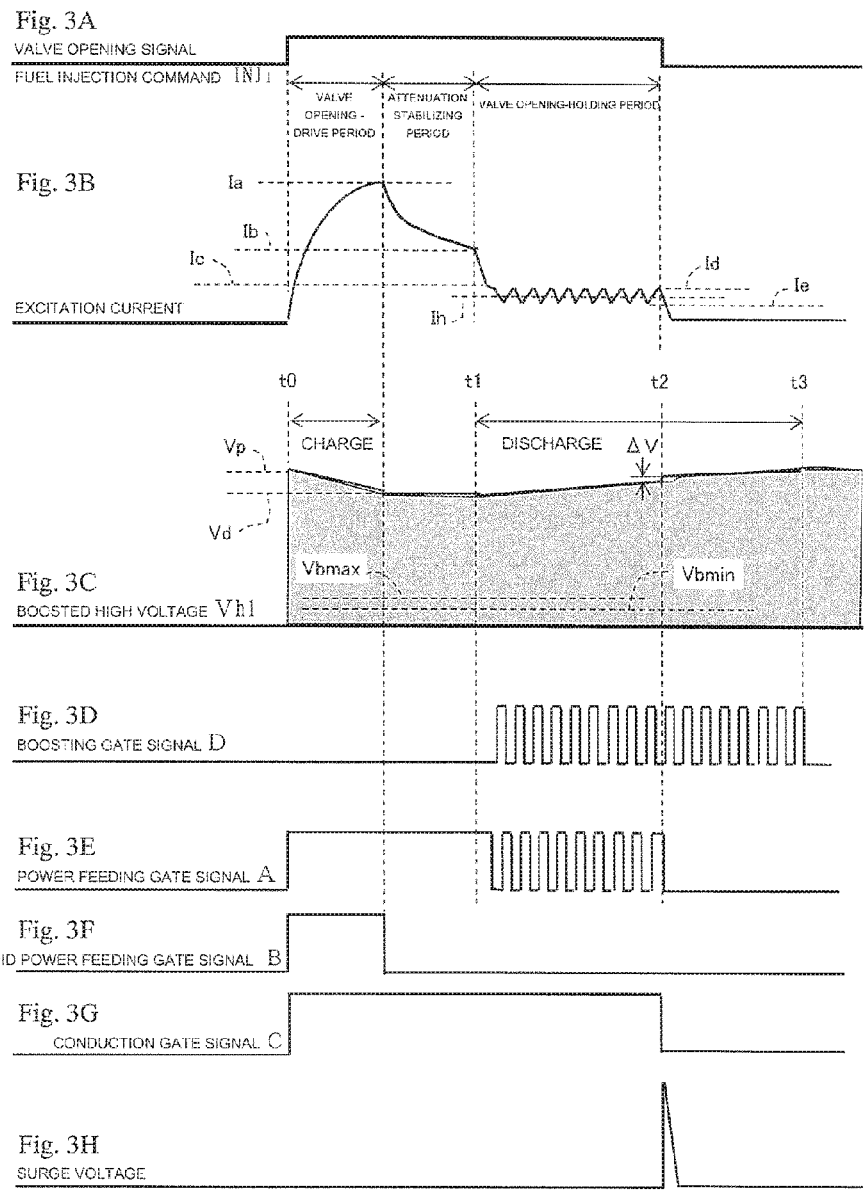
FIGS. 3A-3H is a time chart showing the operations of the apparatus shown in FIG. 1.

In the time chart of FIGS. 3A-3H for explaining the operation of the apparatus in FIG. 1, FIG. 3A shows a logical state of the valve opening command signal according to the fuel injection command INJi for each cylinder, where at time t0 the valve opening command is generated and at time t2 the valve opening command is stopped or ended.

FIG. 3B shows a wave form of an excitation current with respect to the electromagnetic coil 103*i*, where at time t0 a power feeding gate signal A, a rapid power feeding gate signal B, and a conduction gate signal C respectively shown in FIGS. 3E, 3F, and 3G are generated, and the power feeding-sustaining switch element 121*j*, the rapid excitation switch element 122*j*, and the rapid cutoff switch element 123*i* are closed, which makes the excitation current rapidly rise. At the end of a valve opening drive period at the time when the excitation current reaches the peak current Ia or at a time around when it reaches the peak current Ia, the rapid power feeding gate signal B shown in FIG. 3F is stopped and so the rapid excitation switch element 122*j* is opened, whereby the excitation current is attenuated to a valve opening-holding control start current Ib in an attenuation stabilizing period up to the time t1.

Then, the power feeding gate signal A shown in FIG. 3E is intermittently generated. When the excitation current becomes equal to or below the lower limit current Ie of the valve opening-holding current Ih, the power feeding-sustaining switch element 121*j* is closed and when it becomes equal to or above the upper limit current Id, the element 121*j* is opened, so that a predetermined valve opening-holding Ih is maintained.

When the conduction gate signal C in FIG. 3G is stopped as the valve opening signal in FIG. 3A is stopped at time t2, the rapid cutoff switch element 123*i* is opened, so that the high voltage capacitor 114*a* is to be charged with a surge voltage shown in FIG. 3H.

FIG. 3C shows a wave form of the boosted high voltage Vh1 that is the terminal voltage across the high voltage capacitor 114*a*. In the state of the boosted maximum voltage Vp at the end of the initial charging immediately after the power supply switch is closed, when the valve opening drive for the electromagnetic coil 103*i* is performed, Vh1 is decreased to the discharged-attenuated voltage Vd. From time t1, the boosting gate signal D shown in FIG. 3D is generated to reopen the intermittent operations of the boosting switch element 115*a*, and Vh1 reaches the boosted maximum voltage Vp again at time t3, preparing next rapid excitation.

It is to be noted that at time t2 the regenerative charging from the electromagnetic coil 103*i* is performed, at which the high voltage capacitor 114*a* is temporarily incremented by a voltage ΔV.

Also, on the assumption of the high voltage capacitor 114*a* having a sufficiently large electrostatic capacity, the difference between the boosted maximum voltage Vp and the discharged-attenuated voltage Vd is slight, so that even though the rapid cutoff switch element 123*i* is opened at any time between time t1 to time t3, the discharging characteristic of the electromagnetic coil 103*i* is stable, obtaining a stable valve closing characteristic.

Figure 4:
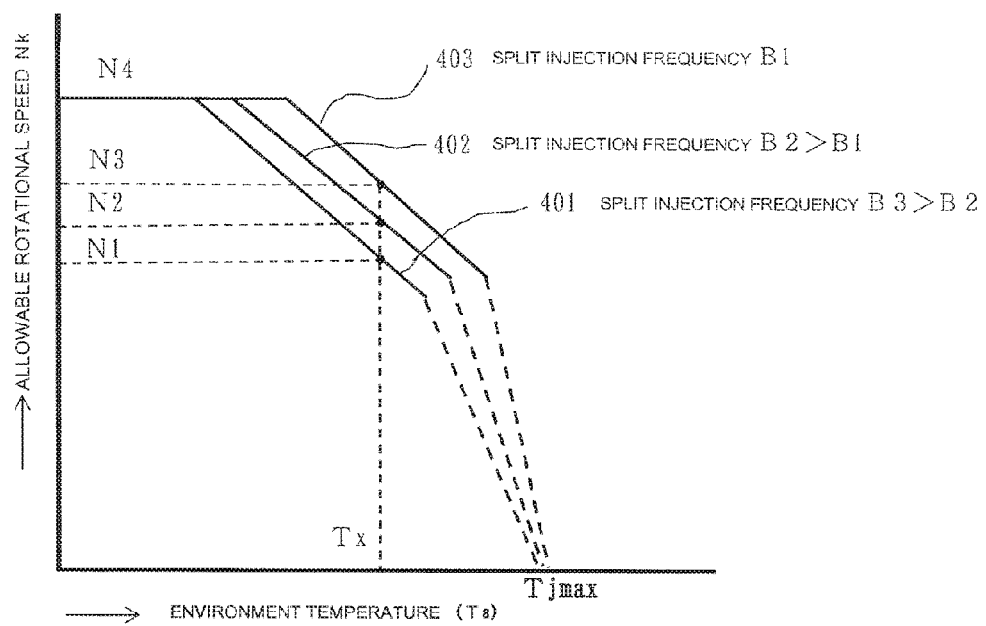
FIG. 4 is a graph showing characteristic curves related to allowable rotational speeds of an engine in the apparatus shown in FIG. 1.

Next, in FIG. 4 showing a characteristic curve diagram related to the allowable rotational speed of the engine, the horizontal axis denotes an environmental temperature Ta within the engine control apparatus 100A detected by the average environmental temperature detection element 139*b*, and the vertical axis denotes and allowable engine rotational speed Nk with a selected value Bn of the split injection frequency being made a parameter.

The statistical data obtained by experimental measurements with respect to the allowable engine rotational speed Nk mentioned herein show that for example, when a selected value of the split injection frequency Bn=B3 and the present value of the environmental temperature Ta is the measured environmental temperature Tx and when the present engine rotational speed Ne measured by the engine rotation sensor 105*e* is equal to or below a first allowable rotational speed N1 on a first characteristic curve 401, the internal temperature of the element to be monitored becomes equal to or below the allowable limit temperature Tjmax even though the split injection control is continued.

Even at the same measured environmental temperature Tx, a second allowable rotational speed N2 is obtained in case of a second characteristic curve 402 where the selected value Bn=B2<B3, and a third allowable rotational speed N3 is obtained in case of a third characteristic curve 403 where the selected value Bn=B1<B2.

It is to be noted that when the engine rotational speed Ne is equal to or more than a predetermined threshold rotational speed N4, the selected value Bn is to select the minimum value B1.

In FIGS. 5A-5F showing data tables where the first characteristic curve 401, the second characteristic curve 402, and the third characteristic curve 403 in FIG. 4 are listed, wherein FIG. 5A shows reference data 501 related to the induction element 112*a*, FIG. 5B shows reference data 502 related to the boosting switch element 115*a*, FIG. 5C shows reference data 503 related to the rapid excitation switch element 122*j*, FIG. 5D shows reference data 504 related to the power feeding-sustaining switch element 121*j*, FIG. 5E shows reference data 505 related to the rapid cutoff switch element 123*i*, and FIG. 5F shows reference data 500 composed by combining FIGS. 5A-5E.

In the reference data 500-505, the uppermost line is partitioned to 15 stages from −30 degrees C. to 110 degrees C. in the environmental temperature Ta.

Selection B3 of the next line represents D*11-D*15 as real number values which are the values of the allowable engine rotational speed Nk corresponding to each environmental temperature Ta on the first characteristic curve 401 supposing that the selection Bn=B3, where a reference symbol "*"=1-5 corresponding to the reference data numbers 501-505, in which "*" is deleted for the reference data number 500.

Likewise, the lowermost selection B1 represents D*31-D*35 as real number values which are the allowable engine rotational speed Nk corresponding to the environmental temperature Ta on the third characteristic curve 403 supposing that the selected value Bn=B1.

It is to be noted that for the power feeding-sustaining switch element 121*j* in FIG. 5D, its temperature rise varies depending on the inlet air amount, so that reference values for a predetermined inlet air amount are listed. The same applies to FIG. 5E.

Also, the data table in FIG. 5F is composed of (D11-D35) which are the minimum values among the data (D11-D135), (D211-D235), (D311-D335), (D411-D435), and (D511-D535).

When the reference data 500 that is a data table is actually used, the first allowable rotational speed N1, the second allowable rotational speed N2, or the third allowable rotational speed N3 corresponding to the actual measured environmental temperature Tx is determined by the interpolation operation with the allowable rotational speed at the environmental temperature Ta around the measured temperature Tx.

It is to be noted that this reference data 500 may also be expressed by using a data table as shown in FIGS. 5A-5F or by an approximated calculation instead of the table.

Also, if it is known that among a plurality of elements to be monitored, specific elements to be monitored has the maximum temperature rise, so inevitably the other elements to be monitored cannot have an excessive temperature by limiting the split injection frequency based on the specific elements to be monitored, any of the reference data 501-505 can be used as the reference data 500 without changes.

Upon preparing the reference data 501-505, the monitored elements (112*a*, 115*a*, 112*j*) and the power feeding-sustaining switch element 121*j* in the in-vehicle engine control apparatus 100A as an experimental object are respectively provided with adjacent temperature sensors for experimental measurements, where it can be determined that the adjacent temperature has reached the allowable engine rotational speed Nk based on the fact that the adjacent temperature detected by the temperature sensor has reached a predetermined maximum temperature.

The in-vehicle engine control apparatus 100A as an experimental object is installed in a temperature controlled bath which can be changed to plural stages together with the fuel injection electromagnetic valve, and is given the fuel injection command signal INJi of a valuable predetermined pulse width at a variable predetermined period by a simulator, whereby the engine rotational speed and the fuel injection amount are equivalently and variably adjusted.

Also, at the experimental stages, the environmental temperature sensors are mounted on various places of the circuit substrate in order to acquire data for determining the installation places of the low environmental temperature detection element 139*a* and the average environmental temperature detection element 139*c*.

Next, FIG. 6 which is a flow chart for describing the operation of the apparatus shown in FIG. 1 will be described.

Figure 6:
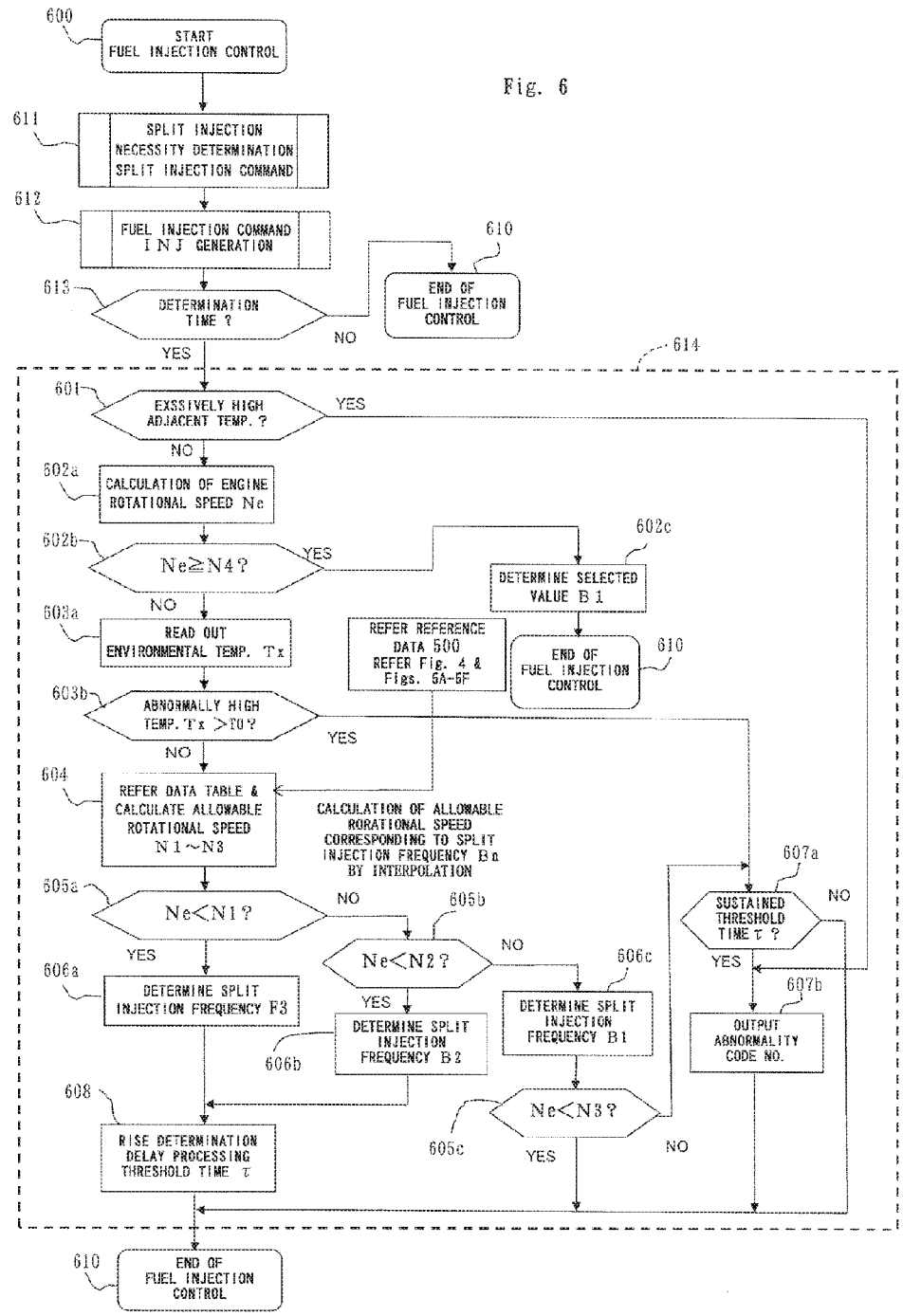
FIG. 6 is a flow chart for explaining the operation of the apparatus shown in FIG. 1.

In FIG. 6, Step 600 is a step for the microprocessor to start the fuel injection control operation. The microprocessor CPU executes from the start step to the operation end step which is Step 610 as will be described, then executes the other control programs, and returns to Step 600 again, the following steps being repeatedly executed, where the repetition period is shorter than the fuel injection interval at the maximum rotational speed of the engine.

The next step block 611 forms, as split injection command means for determining whether or not the split injection command should be performed judging from the present operation state, where whether a collective injection of one time should be performed or split injections of plural times (multiple split injections) should be performed during one fuel cycle period of the engine is determined. In the initial operation of which injection frequency is not known, a single fuel injection is designated.

The next step block 612 forms fuel injection command means for generating a single or multiple fuel injection command signal INJi during one fuel cycle in response to the determination contents of step block 611, where depending on the generation timing and the generation period of the fuel injection command signal INJi, the fuel injection timing and the fuel injection time are determined.

The next step 613 is a determination step for determining whether or not it is the time that the split upper limit designating means corresponding to step block 614 composed of steps 601-608 should be executed, so that e.g. the determination of YES is made at intervals of e.g. a few seconds, proceeding to step 601, while at the other time the determination of NO is made, proceeding to the operation end step 610.

Step 601 is adjacent temperature determination means for determining whether or not a measured adjacent temperature Ty detected by the adjacent temperature detection element 119 has exceeded a control target value of the allowable limit temperature Tjmax in the inside of e.g. boosting switch element 115*a* minus a predetermined margin. If it is the case, the determination of YES is made, proceeding to step 607*b*, where the occurrence of the high temperature abnormality determination signal is stored, while if it is not the case, the determination of NO is made, proceeding to step 602*a*.

At step 602*a*, the pulse generation frequency is measured by the engine rotation sensor 105*e* and the present engine rotational speed Ne is calculated, proceeding to step 602*b*.

At step 602*b*, whether or not the engine rotational speed Ne calculated at step 602*a* is the above predetermined threshold rotational speed N4 or more is determined. If it is the case, the determination of YES is made, proceeding to step 602*c*, while if it is not the case, the determination of NO is made, proceeding to step 603*a*.

It is to be noted that the threshold rotational speed N4 is an engine rotational speed making the selected value Bn of the split injection frequency the minimum frequency B1 unconditionally if the engine rotational speed is the threshold rotational speed N4 or more.

Step 602*c* is a step forming minimum selected value application means in which as the selected value Bn the minimum injection frequency B1 is designated, then proceeding to operation end step 610.

Step 603*a* reads out a measured environmental temperature Tx detected by the average environmental temperature detection element 139*b*, proceeding to step 603*b*.

Step 603*b* forms high temperature environmental determination means, in which whether or not the measured environmental temperature Tx read out at step 603*a* has exceeded a predetermined reference environmental temperature T0 is determined. If it is the case, the determination of YES is made, proceeding to step 607*a*, while if it is not the case, the determination of NO is made, proceeding to step 604.

At step 604, allowable engine rotational speeds N1, N2, and N3 are calculated by the interpolation operation from the data table in FIGS. 5A-5F forming the reference data 500 stored in the program memory PRG, corresponding to the injection frequency based on the selected value Bn and the measured environmental temperature Tx read out at step 603*a*, proceeding to step 605*a*.

Step 605a is a determination step, in which whether or not the present engine rotational speed Ne calculated at step 602a is below the first allowable rotational speed N1 calculated at step 604. If it is the case, the determination of YES is made, proceeding to step 606a, while if it is not the case, the determination of NO is made, proceeding to step 605b.

Step 606a selects the selected value Bn=B3 and proceeds to step 608.

Step 605b is a determination step for determining whether or not the present engine rotational speed Ne calculated at step 602a is below the second allowable rotational speed N2 calculated at step 604. If it is the case, the determination of YES is made, proceeding to step 606b, while if it is not the case, the determination of NO is made, proceeding to step 606c.

Step 606b selects the selected value Bn=B2 and proceeds to step 608.

Step 606c determines the selected value Bn=B1 and proceeds to step 605c.

Step 605c is a determination step for determining whether or not the present engine rotational speed Ne calculated at step 602a is below the third allowable rotational speed N3 calculated at step 604. If it is the case, the determination of YES is made, proceeding to the operation end step 610, while if it is not the case, the determination of NO is made, proceeding to step 607a.

Step 607a is a determination step, in which whether or not abnormality determination at step 603b or step 605c is held for more than a predetermined threshold time τ is determined, where if it is the case, the determination of YES is made, proceeding to step 607b, while if not the case, the determination of NO is made, proceeding to the operation end step 610.

Step 607b forms abnormality alarming means, in which an abnormality alarming output is generated when at step 601 the adjacent temperature is determined to be abnormally high, and an abnormality alarming output is also generated when the occurrence state of the environmental abnormality determination signal at step 603b continues for more than the predetermined threshold time t, or when a state where the present engine rotational speed Ne is determined to be excessively high at step 605c even though the selected value Bn is made the minimum B1 at step 606c continues for more than the predetermined threshold time τ, whereby at least abnormality occurrence information is saved or multiple injection controls are stopped, proceeding to the operation end step 610.

Step 608 forms rise selection delay processing means, in which upon the selection at steps 606a and 606b, when a rise selection command for selecting the selected value Bn to take a value larger than the previously selected value Bn is continuously generated even after a predetermined threshold time τ has elapsed, the rise processing of the selected value Bn is made valid, while when the selection at step 606b indicates a declination, it is immediately made valid, proceeding to step 610.

It is to be noted that the value of the predetermined threshold time τ applied in the abnormality alarming means 607b or the declination selection delay processing means 608 indicates a value more than a thermal time constant τ0 related to an internal average temperature of the element to be monitored; this thermal time constant τ0 is a physical constant corresponding to an elapsed time until the temperature variation of 63% of a temperature variation value±ΔTmax occurs when the consumed power of the monitored element is rapidly incremented or decremented by a variation vale ΔP, wherein a temperature increment value is +ΔTmax or the temperature decrement value is −ΔTmax at the time when the internal average temperature of the element is increased up to a saturated value or decreased down to a saturated value, respectively.

While in the above description, steps 605a, 605b, and 605c which determine the magnitude (large, middle, or small) of the engine rotational speed Ne makes the determination immediately according to a single comparison result, it is also possible to add such confirmation determination means that when the determination of YES or NO continues to reveal the same comparison result in the consecutive two calculation cycles of the calculation cycle from e.g. operation step 600 to operation end step 610, the determination is fixed to YES or NO while when the comparison result which does not continue is obtained, the last determination result is given a priority.

(3) Gist and Feature of Embodiment 1

As seen from the above description, an in-vehicle engine control apparatus according to Embodiment 1 of the present invention relates to an in-vehicle engine control apparatus 100A for sequentially driving a fuel injection electromagnetic valve provided for each cylinder i (i=1, 2, . . . m) of a multi-cylinder engine, comprising a drive control circuit portion 120A including a plurality of switch elements for alternately and sequentially driving a plurality of electromagnetic coils 103i for driving the electromagnetic valves to be opened for each of a first cylinder group j (j=1) and a second cylinder group j (j=2), a boosting control circuit portion 110A which generates a boosted high voltage for rapidly exciting the electromagnetic coils 103i, and an operation control circuit portion 130A mainly composed of a microprocessor CPU and a program memory PGM, the boosting control circuit portion 110A including one induction element 112a intermittently excited by one boosting switch element 115a from an in-vehicle battery 101, and one high-voltage capacitor 114a which is charged to the boosted high voltage Vh1 as a target through multiple intermittent operations by electromagnetic energy accumulated in the induction element 112a being discharged when the boosting switch element 115a is opened, and the drive control circuit portion 120A including a power feeding-sustaining switch element 121j connected for each cylinder group through a backflow prevention element 125j between the in-vehicle battery 101 and the electromagnetic coils 103i, a rapid excitation switch element 122j connected for each cylinder group between the high-voltage capacitor 114a and the electromagnetic coils 103i, a commutation circuit element 126j connected for each cylinder group in parallel with the electromagnetic coil 103i, and a rapid cutoff switch element 123i individually connected in series with the electromagnetic coil 103i.

The operation control circuit portion 130A further includes fuel injection command means 612 which provides a fuel injection command INJi to the plural switch elements 121j, 122j, and 123i, a control program forming split upper limit designating means 614 which designates an upper limit value of a selected value Bn for determining how many times the fuel injection command signal INJi should be provided to the same electromagnetic coil 103i during one combustion cycle period of each engine in the multi-cylinder engine, and a reference data 500 which is a data table or an approximated calculation, the reference data 500 is an aggregation of reference data 501-505 respectively related to a plurality of elements to be monitored, in which the reference data 500 includes the selected value Bn limited by the split upper limit designating means 614 as a mediate parameter, and is composed of minimum values edited of numerical data of allowable engine rotational speed Nk determined by a detected environmental temperature Tx, as a parameter, detected by an environmental temperature detection element 139b and related to installation environments of the elements to be monitored, representing any of the induction element 112a, the boosting switch element 115a, the rapid excitation switch element 122j, the power feeding-sustaining switch element 121j, and the rapid cutoff switch element 123i, the allowable engine rotation speed Nk is statistic data obtained by experimentally confirming that the internal temperature of the elements to be monitored becomes equal to or less than a predetermined allowable limit temperature Tjmax even in case of a continuous operation with multiple injections by applying the selected value Bn designated to the measured environmental temperature Tx, and the split upper limit designating means 614 determines the selected value Bn having a higher split injection frequency as an upper limit within an allowable range by comparing an engine rotational speed Ne detected by an engine rotation sensor 105e and a value of the allowable engine rotational speed Nk with respect to the measured environmental temperature Tx at present calculated by an interpolation operation from the reference data 500.

The program memory PGM further includes a control program forming a minimum selected value application means 602c, and the minimum selected value application means 602c is adapted to designate the selected value Bn of the split injection frequency a minimum selected value B1 when the engine rotational speed Ne detected by the engine rotation sensor 105e is equal to or more than a predetermined threshold rotational speed N4.

Thus, in relation to claim 2 of the present invention, the minimum selected value application means is adapted to set the selected value of the split injection frequency to the lowest level when the engine rotational speed is equal to or more than the predetermined threshold rotational speed.

Therefore, there is a feature that in a high speed operation area in which a high speed control burden of the microprocessor grows, a fixed selected value can be determined for vehicle operations without complicated calculations. This applies to Embodiments 2-4.

The program memory PGM includes a control program forming high environmental temperature determining means 603b, a rotation abnormality determining means 605c, and an abnormality alarming means 607b, the high environmental temperature determining means 603b generates an environmental abnormality determination signal when the measured environmental temperature Tx detected by the environmental temperature detection element 139b exceeds a predetermined reference environmental temperature T0, the rotation abnormality determining means 605c generates a rotation abnormality determination signal when the present engine rotational speed exceeds an allowable rotational speed calculated from the reference data although a selected value level of the split injection frequency is set to be low, and the abnormality alarming means 607b generates an abnormality alarming command when an occurrence state of the environmental abnormality determining signal or the rotation abnormality determining signal continues for a predetermined threshold time t or longer, thereby at least saving an abnormality occurrence information or stopping multiple injection controls.

Thus, in relation to claim 3 of the present invention, when the measured environmental temperature by the environmental temperature detection element is abnormally high or when the operation of an engine rotational speed in excess of the allowable rotational speed calculated from the reference data is sustained despite that the selected value level of the split injection frequency is set to be low, an abnormality alarming command will be generated.

Therefore, there is a feature that upon the generation of the abnormality alarming command, the multiple injection controls is stopped, so that temperature rise of the boosting switch element can be suppressed and the abnormality occurrence history information can be saved. This applies to Embodiments 2-4.

The program memory PGM further includes a control program forming rise selection delay processing means 608, and the rise selection delay processing means 608 executes rise processing of a selected value Bn when the engine rotational speed Ne decreases or the measured environmental temperature Tx decreases, so that the split upper limit designating means 614 generates the rise selection command for selecting a larger value as the selected value Bn and if the rise selection command still continues to be generated even after a predetermined threshold time $\tau$ has lapsed.

Thus, in relation to claim 4 of the present invention, when the selected value of the split injection frequency is changed to rise or a higher value, the rise processing of the selected value will be executed after a predetermined threshold time has elapsed.

Therefore, there is a feature that while as the selected value of the split injection frequency is changed to rise, the temperature rise of the monitored element increases, the rise change will be executed after having confirmed that the engine rotational speed or the environmental temperature decreases and the internal temperature of the monitored element decreases correspondingly, so that the internal temperature of the monitored element can be prevented from rising abnormally.

This applies to Embodiments 2-4.

The value of the predetermined threshold time $\tau$ applied in the abnormality alarming means 607b or the rise selection delay processing means 608 is equal to or more than a thermal time constant $\tau 0$ related to the internal average temperature of the monitored element, and the thermal time constant $\tau 0$ is a physical constant corresponding to an elapsed time until the temperature variation of 63% of a temperature variation value $\Delta$Tmax occurs, when the consumed power of the monitored element is rapidly incremented or decremented by a variation value $\Delta$P, wherein a temperature increment value at the time when the internal average temperature of the monitored element is increased up to a saturated value is made +$\Delta$Tmax or a temperature decrement value at the time when the internal average temperature of the monitored element is decreased down to a saturated value is made $-\Delta$Tmax.

Thus in relation to claim 5 or claim 6 of the present invention, the predetermined threshold time $\tau$ that is a determination waiting time while the abnormality alarming means executes the abnormality determination or while the rise selection delay processing means executes the rise processing is equal to or more than the thermal time constant $\tau 0$ of the internal average temperature of the monitored element.

Therefore, there is a feature that the abnormality determination is not erroneously executed or the local temperature of the monitored element is not abnormally increased due to immoderate rise operation of the selected value.

This applies to Embodiments 2-4.

An adjacent temperature detection element 119 is arranged at the nearest position of the monitored element, and the program memory PGM further includes a control program forming adjacent temperature determining means 601, the adjacent temperature detection element 119 serves to estimate the internal average temperature of the monitored element, and a measured adjacent temperature Ty detected by the corresponding adjacent temperature detection element is inputted to the microprocessor CPU, the adjacent temperature determining means 601 generates a high temperature abnormality determining signal when the value of the measured adjacent temperature Ty exceeds a control target value of the internal allowable limit temperature Tjmax of the monitored element minus a predetermined margin, and the abnormality alarming means 607b generates an abnormality alarming command due to the adjacent temperature determining means 601 generating the high temperature abnormality determining signal, thereby at least saving the abnormality occurrence alarm or stopping multiple injection controls.

Thus, in relation to claim 7 of the present invention, the adjacent temperature detection element for detecting the temperature of the nearest position of the monitored element is additionally provided, whereby when the measured adjacent temperature detected exceeds a predetermined control target value, the abnormality alarming command will be generated.

Therefore, there is a feature that upon the generation of the abnormality alarming command, the multiple injection controls are stopped to suppress the temperature rise of the monitored element, and that an abnormality occurrence history information can be saved by identifying whether the abnormality occurrence factor is due to a high temperature abnormality due to the adjacent temperature determining means or environmental abnormality due to the high environmental temperature determining means, or whether or not it is such a high rotational abnormality that the actual engine rotational speed is larger than the allowable engine rotational speed calculated from the reference data.

Also, there is a feature that the high temperature abnormality determination of the adjacent temperature can directly detect a high temperature state of the inside of the monitored element compared with the determination of environmental temperature abnormality or high speed rotation abnormality.

On the other hand, there is a feature that since the local temperature of junction portions of the monitored element rises more sharply than the thermal time constant $\tau 0$ related to the inside average temperature, it is not preferable to generate an excessive consumed power only depending on the adjacent temperature determining means even if there is a thermal margin, so that erroneous determination based on a control error can be prevented mainly with the control of environmental abnormality determination by high environmental temperature determination or high-speed rotation abnormality determination with the reference data, supplementarily together with the control of high temperature abnormality determination.

This applies to Embodiments 2-4.

The operation control circuit portion 130A, the boosting control circuit portion 110A, and the drive control circuit portion 120A are mounted on a circuit substrate 200 stored in the case 109, the monitored element includes a specific monitored element composed of the induction elements 112a, the boosting switching element 115a, and the rapid excitation switch element 122j which have a temperature rise increasing as the selected value Bn is increased, assuming that the environmental temperature detection element be the low environmental temperature detection element 139a in a lower temperature distribution area than the average temperature related to the thermal distribution within the case 109 and the high environmental temperature detection element 139c arranged adjacent to the power feeding-sustaining switch element 121j inside the drive control circuit portion 120A, the temperature detected by the average environmental temperature detection element 139b set at a place having an environmental temperature corresponding to the average value of the temperatures detected by the low environmental temperature detection element 139a and the high environmental temperature detection element 139c is made the measured environmental temperature Tx of the specific monitored element.

Thus, in relation to claim 9 of the present invention, as the environmental temperature of the specific monitored element that is the induction element, the boosting switch element, and the rapid excitation switch element, the average temperature of the low environmental temperature within the case storing the circuit substrate and the high environmental temperature at a position adjacent to the power feeding-sustaining switch element is applied.

Therefore, there is a feature that the temperature rise value of the highly heated element that is the specific monitored element is approximately determined by the product of the magnitude of the engine rotational speed and the split injection frequency, and by adding this temperature rise value to the measured average environmental temperature the internal temperature of the specific monitored element can be estimated in view of the heated state of the power feeding-sustaining switch element, so that if allowable values of the engine rotational speed providing a predetermined allowable limit value or less to the inside temperature under the environmental temperature and the split injection frequency given are preliminarily prepared as reference data, the allowable rotational speed can be easily calculated without estimations of internal temperatures at the stage of actual machine operation, whereby the allowable rotational speed becomes a suppressed one when the power feeding-sustaining switch element is highly heated.

The design is made such that the consumed power of the power feeding-sustaining switch element is increased by the split injection frequency, mainly increased in proportion to the valve opening time of the fuel injection valve, on the basis of the environmental temperature of which internal temperature becomes a predetermined value or less with respect to a large consumed power at the time of high load/high speed operation.

However, when such a high speed operation with a high split injection frequency continues, the temperature rise of the induction element, the boosting switch element, and the rapid excitation switch element becomes high, and consequently the environmental temperature of the power feeding-sustaining switch element is increased, so that the power feeding-sustaining switch element will be also influenced by the split injection frequency directly or indirectly.

In contrast, in combination of the environmental temperature of the specific monitored element with the thermal components of the power feeding-sustaining switch element, the split injection frequency can be determined so that the internal temperatures of the specific monitored element and the power feeding-sustaining switch element may become a predetermined value or less.

It is to be noted that while in case of the rapid cutoff switch element of a circuit type absorbing the electromagnetic energy accumulated in the electromagnetic coil upon the conduction cutoff with the switch element, consumed power in proportion to the product of the split injection frequency as well as the engine rotational speed is generated and forms one element to be monitored, it can be removed from the elements to be monitored by preliminarily absorbing the electromagnetic energy upon the conduction cutoff with the high voltage capacitor or the mediate capacitor.

As seen from the above description, an in-vehicle engine control apparatus according to Embodiment 1 of the present invention relates to an in-vehicle engine control apparatus 100A for sequentially driving a fuel injection electromagnetic valve provided for each cylinder i (i=1, 2, ... m) of a multi-cylinder engine, comprising a drive control circuit portion 120A including a plurality of switch elements for alternately and sequentially driving a plurality of electromagnetic coils 103$i$ for driving the electromagnetic valves to be opened, for each of a first cylinder group j (j=1) and a second cylinder group j (j=2), a boosting control circuit portion 110A which generates a boosted high voltage for rapidly exciting the electromagnetic coils 103$i$, and an operation control circuit portion 130A mainly composed of a microprocessor CPU and a program memory PGM, the boosting control circuit portion 110A comprising one induction element 112$a$ intermittently excited by one boosting switch element 115$a$ from an in-vehicle battery 101, and one high-voltage capacitor 114$a$ which is charged to the boosted high voltage Vh1 as a target through multiple intermittent operations by electromagnetic energy accumulated in the induction element 112$a$ being discharged when the boosting switch element 115$a$ is opened, and the drive control circuit portion 120A comprising a power feeding-sustaining switch element 121$j$ connected for each cylinder group through a backflow prevention element 125$j$ between the in-vehicle battery 101 and the electromagnetic coils 103$i$, a rapid excitation switch element 122$j$ connected for each cylinder group between the high-voltage capacitor 114$a$ and the electromagnetic coils 103$i$, a commutation circuit element 126$j$ connected for each cylinder group in parallel with the electromagnetic coil 103$i$, and a rapid cutoff switch element 123$i$ individually connected in series with the electromagnetic coil 103$i$.

And, the operation control circuit portion 130A includes a control program forming a split upper limit designating means 614 which designates an upper limit of the selected value Bn for determining how many times the fuel injection command signal INJi should be generated to the same electromagnetic coil 103$i$ during one combustion cycle period of each engine of the multi cylinder engine, and a reference data 500 which is a data table or approximated calculation, composed by consolidating experimental data related to a plurality of elements to be monitored, the split upper limit designating means 614 designates the selected value Bn a possible higher split injection frequency as an upper limit on a condition that the internal temperature of the monitored element becomes equal to or less than a predetermined allowable limit value in association with the present measured environmental temperature Tx detected by the environmental temperature detection element 139$b$, an allowable engine rotational speed Nk calculated from the reference data 500, and the present engine rotational speed Ne detected by the engine rotation sensor 105$e$, and further including loss suppressing means which suppresses the temperature of at least one part of the switch element provided within the boosting control circuit portion 110A and the drive control circuit portion 120A from rising.

The switch elements which drives the electromagnetic coil 103$i$ (i=1, 2, ... m) comprises a rapid cutoff switch element 123$i$ individually connected to each electromagnetic coil 103$i$, a rapid excitation switch element 122$j$ (j=1) as well as a power feeding-sustaining switch element 121$j$ (j=1) used for each electromagnetic coil 103$i$ of the first cylinder group in common, a rapid excitation switch element 122$j$ (j=2) as well as a power feeding-sustaining switch element 121$j$ (j=2) used for each electromagnetic coil 103$i$ of the second cylinder group in common, the rapid excitation switch element 122$j$ (j=1, 2) applies a boosted high voltage VIh1 from the high voltage capacitor 114$a$ to the upstream side terminal of the electromagnetic coil 103 of the first cylinder group or the second cylinder group to provide a rapid excitation current, during a predetermined time interval immediately after the fuel injection command INJi is generated, the power feeding-sustaining switch element 121$j$ intermittently applies the power source voltage Vbb of the in-vehicle battery 101 through the backflow prevention element 125$j$ (j=1, 2) to the upstream terminal of the electromagnetic coil 103$i$ of the first cylinder group or the second cylinder group during a period for which the fuel injection command INJi is generated, providing a valve opening-holding current, so that the valve opening-holding current of the electromagnetic coil 103 following the intermittent operation of the power feeding-sustaining switch element 121$j$ is commuted and attenuated by the commutation circuit element 126$j$ (j=1, 2) for each cylinder group, the rapid cutoff switch element 123$i$ connects the downstream side terminal of the electromagnetic coil 103$i$ to the ground circuit during a period for which the fuel injection command INJi is generated, and further including a collection diode 160$i$ which releases a flyback voltage generated across the terminals of the rapid cutoff switch element 123$i$ to the high voltage capacitor 114A when the rapid cutoff switch element 123$i$ is opened, so that the maximum voltage variation range before and after the charging of the high voltage capacitor 114$a$ is limited to the power supply voltage Vbb of the in-vehicle battery 101 or less.

Thus, in relation to claim 13 of the present invention, the collection diode is connected to the rapid cutoff switch element which individually cuts off the excitation current of the electromagnetic coil at a high-speed, and when the rapid cutoff switch element is opened, the electromagnetic energy accumulated in the electromagnetic coil is to be regeneratively charged to the high voltage capacitor, so that the variation range before and after the charging of the boosted high voltage is limited to a predetermined value or less.

Therefore, there is a feature that since the electromagnetic energy accumulated in the electromagnetic coil is not absorbed by the rapid cutoff switch element, the consumed power of the rapid cutoff switch element is suppressed, and since the electromagnetic energy regeneratively charged to the high voltage capacitor is used for the next rapid excitation of the magnetic coil, the charged energy of the high voltage capacitor by the boosting control circuit portion can be reduced.

Also, there is a feature that since the voltage variation range of the high voltage capacitor is limited, the current attenuation characteristic of the electromagnetic coil when the rapid cutoff switch element is opened is stabilized, thereby achieving stable valve closing characteristics.

While it is disadvantageous in this Embodiment that since the rapid cutoff switch element is connected in series with the power feeding-sustaining switch element and the rapid excitation switch element, the conduction current to the electromagnetic coil flows through two switch elements on the upper stream side and the downstream side, providing a large consumed power, when a short circuit fault of one of the switch elements on the upstream side and the downstream side, or a sky fault or grand fault of an external wiring occurs, the conduction current can be cut off by the other of the switch elements.

Embodiment 2

(1) Detailed Description of Arrangement and Effect

Hereinafter, the arrangement and the effect will be described referring to FIG. 7 showing the entire circuit block diagram of an in-vehicle engine control apparatus according to Embodiment 2 of the present invention in attention to the difference from the apparatus shown in FIG. 1.

Throughout the figures the same reference numerals indicate identical or corresponding portions, in which the in-vehicle engine control apparatus 100A is replaced by an in-vehicle engine control apparatus 100B with the alphabet of the capital letter of the reference numeral's tail for indicating each Embodiment.

In FIG. 7, the first main difference between the apparatus in FIG. 7 and the apparatus in FIG. 1 is that with respect to the four electromagnetic coils 31-34 driving the fuel injection electromagnetic valves, a boosting control circuit portion 110B comprises two induction elements 112a, 112b, two boosting switch elements 115a, 115b for intermittently activating the induction elements 112a, 112b, and a pair of charging diodes 113a, 113b, while the high-voltage capacitor 114a remains the same one.

Also, the second and third main differences are that a parallel switch element 169j is added in parallel with the power feeding-sustaining switch element 121j, and a parallel switch element 129j is added in parallel with the rapid excitation switch element 122j.

Similarly, to the electromagnetic coils 33, 32 of the second group, the power feeding-sustaining switch element 121j as well as the parallel switch element 169j, and the rapid excitation switch element 122j and the parallel switch element 129j are connected.

Therefore, each switch element in the drive control circuit portion 120B is assigned one with respect to one electromagnetic coil. This number of assignment is the same as the rapid cutoff switch element 123i.

The fourth main difference is that the flyback energy of the electromagnetic coil 103i when the rapid cutoff switch element 123i is opened can be collected by the high-voltage capacitor 114a through the collection diode 160i in the same as the case of FIG. 1, or can be consumed by the rapid cutoff switch element 123i itself through the effect of the voltage limiting diode 124i parasitic in the inside of the rapid cutoff switch element 123i without the collection diode 160i.

The fifth main difference is that the operation control circuit portion 130B uses the environmental temperature Ta measured by the low environmental temperature detection element 139a having been described referring to FIG. 6 as the measured environmental temperature Tx.

In the boosting control circuit portion 110B arranged as shown in FIG. 7, when the boosting switch element 115a is closed, the induction element 112a is excited from the in-vehicle battery 101 while the other boosting switch element 115b is opened. When this boosting switch element 115b is opened, the electromagnetic energy accumulated in the other induction element 112b is discharged and charged to the common high-voltage capacitor 114a through the charging diode 113b.

Similarly, when the boosting switch element 115b is closed, the induction element 112b is excited from the in-vehicle battery 101 while the other boosting switch element 115a is opened. When this boosting switch element 115a is opened, the electromagnetic energy accumulated in the other induction element 112a is discharged and charged to the common high-voltage capacitor 114a through the charging diode 113a.

As a result, as shown in FIG. 3C, with the discharged-attenuated voltage Vd being made a value approximating the boosted maximum voltage Vp, the common high-voltage capacitor 114a is charged alternately with the pair of induction elements 12a, 112b and the pair of boosting switch elements 115a, 115b, whereby a high frequency split injection can be made and the generated heat can be dispersed by the pair of induction elements 112a, 112b and the pair of boosting switch elements 115a, 115b.

It is to be noted that the one high-voltage capacitor 114a may be composed of two capacitors of a small capacity simply connected in parallel.

In the drive control circuit portion 120B arranged shown in FIG. 7, the gate control circuit 128 generates a power feeding gate signals A1 and A2 simultaneously, and the power feeding-sustaining switch element 121j and the parallel switch element 169j are driven to close the circuit always at the same time.

Similarly, the gate control circuit 128 generates rapid power feeding gate signals B1 and B2 at the same time, and the rapid excitation switch element 122j and the parallel switch element 129j are driven to close the circuit always at the same time.

It is to be noted that each switch element connected in parallel uses a field effect transistor and the internal resistance of this type of transistor has a positive thermal coefficient increasing along with temperature rise.

Therefore, when the parallel switch elements are closed at the same time, the conduction current is concentrated on one of the switch elements with a less internal resistance, so that the internal resistance increased along with the temperature rise approaches the internal resistance of the opponent switch element, enabling the thermal equilibrium to be maintained.

There is a feature that in case where the electromagnetic energy accumulated in the electromagnetic coil 103i is absorbed by the rapid cutoff switch element 123i without the collection diode 160i, the current cutoff characteristic is not influenced even by the voltage variation of the high-voltage capacitor 114a.

In the operation control circuit portion 130B arranged as shown in FIG. 7, the measured environmental temperature Tx inputted to the microprocessor CPU is provided by the low environmental temperature detection element 139a shown in FIG. 2. This low environmental temperature detection element 139a is, as aforementioned referring to FIG. 2, mounted on an area of the circuit substrate 200 which is lower in thermal distribution than the average temperature related to the thermal distribution within the case 109, and serves to measure the environmental temperature Ta of the corresponding monitored element as the measured environmental temperature Tx in a place not adjacent to a highly heated part including at least a monitored element.

(2) Gist and Feature of Embodiment 2

As seen from the above description, an in-vehicle engine control apparatus according to Embodiment 2 of the present invention relates to an in-vehicle engine control apparatus 100B for sequentially driving a fuel injection electromagnetic valve provided for each cylinder i (i=1, 2, . . . m) of a multi-cylinder engine, comprising a drive control circuit portion 120B including a plurality of switch elements for alternately and sequentially driving a plurality of electromagnetic coils 103i for driving the electromagnetic valves to be opened for each of a first cylinder group j (j=1) and a second cylinder group j (j=2), a boosting control circuit portion 110B which generates a boosted high voltage for rapidly exciting the electromagnetic coils 103i, and an operation control circuit portion 103B mainly composed of a microprocessor CPU and a program memory PGM, the boosting control circuit portion 110B comprising a plurality of induction element 112a, 112b intermittently excited by a plurality of boosting switch element 115a, 115b from an in-vehicle battery 101, and one high-voltage capacitor 114a which is charged to the boosted high voltage Vh1 as a target through multiple intermittent operations by electromagnetic energy accumulated in the induction elements 112a, 112b being discharged when the boosting switch elements 115a, 115b is opened, and the drive control circuit portion 120B comprising a power feeding-sustaining switch element 121j connected for each cylinder group through a backflow prevention element 125j between the in-vehicle battery 101 and the electromagnetic coils 103i, a rapid excitation switch element 122j connected for each cylinder group between the high-voltage capacitor 114a and the electromagnetic coil 103i, a commutation circuit element 126j connected for each cylinder group in parallel with electromagnetic coil 103i, and a rapid cutoff switch element 123i individually connected in series with the electromagnetic coil 103i.

And, the operation control circuit portion 130B includes a fuel injection command means 612 which provides a fuel injection command INJi to the switch elements 121j, 122j, and 123i, control program forming split upper limit designating means 614 which designates an upper limit value of a selected value Bn for determining how many times the fuel injection command signal INJi should be provided to the same electromagnetic coil 103i during one combustion cycle period of each engine in the multi-cylinder engine, and a reference data 500 which is a data table or an approximated calculation, the reference data 500 is an aggregation of reference data 501-505 respectively related to a plurality of elements to be monitored, in which the reference data 500 includes the selected value Bn restricted by the split upper limit designating means 614 as a mediate parameter, and is composed of minimum values edited of numerical data of allowable engine rotational speed Nk determined by a detected environmental temperature Tx, as a parameter, detected by an environmental temperature detection element 139b and related to installation environments of the elements to be monitored, representing any of the induction elements 112a, 112b, the boosting switch element 115a. 115b, the rapid excitation switch element 122j, the power feeding-sustaining switch element 121j, and the rapid cutoff switch element 123i, the allowable engine rotation speed Nk is statistic data obtained by confirming that the internal temperature of the elements to be monitored becomes equal to or less than a predetermined allowable limit temperature Tjmax even in case of a continuous operation with multiple injections by applying the selected value Bn designated to the measured environmental temperature Tx, and the split upper limit designating means 614 determines the selected value Bn having a higher split injection frequency as an upper limit within an allowable range by comparing an engine rotational speed Ne detected by an engine rotation sensor 105e and the value of the allowable engine rotational speed Nk with respect to the measured environmental temperature Tx at present calculated by an interpolation operation from the reference data 500.

The operation control circuit portion 130B, the boosting circuit portion 110B, and the drive control circuit portion 120B are mounted on the circuit substrate 200 stored in the case 109, the monitored element includes the induction elements 112a, 112b, the boosting switching elements 115a, 115b, and the rapid excitation switch element 122j, in which the temperature rise is increased as the selected value Bn is increased, and the environmental temperature detection element is a low environmental temperature detection element 139a which measures the environmental temperature Ta of the monitored element as the measured environmental temperature Tx, which is set outside or inside the case 109; if it is mounted on the circuit substrate 200 for convenience sake of wiring, it is mounted on the circuit substrate 200 in a temperature distribution area lower than at least the average temperature related to the thermal distribution within the case, the area being not adjacent to a highly heated part including the monitored element.

Thus, in relation to claim 8 of the present invention, the environmental temperature detection element is set in a low temperature area not adjacent to the monitored element, so that at a position distant from the monitored element the environmental temperature is measured.

Therefore, there is a feature that the temperature rise value of the highly heated switch element that is the monitored element is approximately determined by the product of the magnitude of the engine rotational speed and the split injection frequency, and by adding this temperature rise value to the measured environmental temperature the internal temperature of the monitored element can be estimated, so that if allowable values of the engine rotational speed of which internal temperature becomes equal to or below a predetermined allowable limit value under the environmental temperature and the split injection frequency given are preliminarily prepared as reference data, the allowable rotational speed can be easily calculated without estimations of the internal temperature at the stage of actual machine operations.

It is disadvantageous that e.g. the provision of the environmental temperature detection element at a place nearest to the boosting switch element would correspond to measuring the added result of the temperature rise value of the boosting switch element and the environmental temperature, which is unclear as to the distribution thereof; therefore it is necessary to determine what kind of internal temperature is obtained when the engine rotational speed is changed, based on the implemented result, so that the operational rotational speed cannot be predicted.

As seen from the above description, an in-vehicle engine control apparatus according to Embodiment 2 of the present invention relates to an in-vehicle engine control apparatus 100B for sequentially driving a fuel injection electromagnetic valve provided for each cylinder i (i=1, 2, . . . m) of a multi-cylinder engine, comprising a drive control circuit portion 120B including a plurality of switch elements for alternately and sequentially driving a plurality of electromagnetic coils 103$i$ for driving the electromagnetic valves to be opened, for each of a first cylinder group j (j=1) and a second cylinder group j (j=2), a boosting control circuit portion 110B which generates a boosted high voltage for rapidly exciting the electromagnetic coils 103$i$, and an operation control circuit portion 130B mainly composed of a microprocessor CPU and a program memory PGM, the boosting control circuit portion 110B comprising a plurality of induction elements 112$a$, 112$b$ intermittently excited by a plurality of boosting switch elements 115$a$, 115$b$ from an in-vehicle battery 101, and one high-voltage capacitor 114$a$ which is charged to the boosted high voltage Vh1 as a target through multiple intermittent operations by electromagnetic energy accumulated in the induction element 112$a$ being discharged when the boosting switch element 115$a$ is opened, and the drive control circuit portion 120B comprising a power feeding-sustaining switch element 121$j$ connected for each cylinder group through a backflow prevention element 125$j$ between the in-vehicle battery 101 and the electromagnetic coils 103$i$, a rapid excitation switch element 122$j$ connected for each cylinder group between the high-voltage capacitor 114$a$ and the electromagnetic coil 103$i$, a commutation circuit element 126$j$ connected for each cylinder group in parallel with electromagnetic coil 103$i$, and a rapid cutoff switch element 123$i$ individually connected in series with the electromagnetic coil 103$i$.

And, the operation control circuit portion 130B includes a control program forming a split upper limit designating means 624 which designates an upper limit of the selected value Bn for determining how many times the fuel injection command signal INJi should be generated to the same electromagnetic coil 103$i$ during one combustion cycle period of each engine of the multi cylinder engine, and a reference data 500 which is a data table or approximated calculation, composed by consolidating experimental data related to a plurality of elements to be monitored, the split upper limit designating means 614 designates the selected value Bn a possible higher split injection frequency as an upper limit on a condition that the internal temperature of the monitored element becomes equal to or less than a predetermined allowable limit value in association with the present measured environmental temperature Tx detected by the environmental temperature detection element 139$b$, an allowable engine rotational speed Nk calculated from the reference data 500, and the present engine rotational speed Ne detected by the engine rotation sensor 105$e$, and further including loss suppressing means or heat dispersion means which suppresses the temperature rise of at least one part of the switch element provided in the boosting control circuit portion 110B and the drive control circuit portion 120B.

The switch elements which drive the electromagnetic coils 103$i$ (i=1, 2, . . . m) comprises a rapid cutoff switch element 123$i$ individually connected to each electromagnetic coil 103$i$, a rapid excitation switch element 122$j$ (j=1) as well as a power feeding-sustaining switch element 121$j$ (j=1) used for each electromagnetic coil 103$i$ of the first cylinder group in common, and a rapid excitation switch element 122$j$ (j=2) as well as a power feeding-sustaining switch element 121$j$ (j=2) used for each electromagnetic coil 103$i$ of the second cylinder group in common, the rapid excitation switch element 122$j$ (j=1, 2) applies the boosted high voltage VIh1 to the upstream side terminal of the electromagnetic coil 103 of the first cylinder group or the second cylinder group to provide a rapid excitation current during a predetermined time interval immediately after the fuel injection command INJi is generated, the power feeding-sustaining switch element 121$j$ intermittently applies the power source voltage Vbb of the in-vehicle battery 101 through the backflow prevention element 125$j$ (j=1, 2) to the upstream terminal of the electromagnetic coil 103$i$ of the first cylinder group or the second cylinder group during a period for which the fuel injection command INJi is generated to thereby provide a valve opening-holding current, so that the valve opening-holding current of the electromagnetic coil 103 following the intermittent operation of the power feeding-sustaining switch element 121$j$ is commuted and attenuated by the commutation circuit element 126$j$ (j=1, 2), the rapid cutoff switch element 123$i$ connects the downstream side terminal of the electromagnetic coil 103$i$ to the ground circuit during a period for which the fuel injection command INJi is generated, so that when the fuel injection command INJj is released, the energy of the electromagnetic coil 103$i$ is absorbed by the rapid cutoff switch element where the cutoff surge voltage is limited by the voltage limiting diode 124$i$ or absorbed by the high voltage capacitor 114$a$ through the collection diode 160$i$, and at least one of the power feeding-sustaining switch element 121$j$ and the rapid excitation switch element 122$j$ comprises parallel switch elements 169$j$, 129$j$ driven simultaneously, in which each switch element connection in parallel forms a field effect transistor.

Thus, in relation to claim 11 of the present invention, at least one of the power feeding-sustaining switch element and the rapid excitation switch element forming the drive control circuit portion comprises a parallel switch element driven to close the circuit simultaneously.

Therefore, there is a feature that in addition to the rapid excitation switch element performing a high voltage rapid power supply for each cylinder group or the power feeding-sustaining switch element which supplies the valve opening-holding current, a parallel switch element is used, enabling the dispersion of the temperature rise to be suppressed and besides the number of connecting terminals to the electromagnetic coil to be reduced.

It is to be noted that while in case of the switch element used in parallel, the current of the switch element on the lower resistance side is increased and so the consumed power is increased, the internal resistance of the field effect transistor is increased along with the temperature rise, being averaged by the thermal equilibrium with the opponent switch element.

The boosting circuit portion 110B comprises a pair of induction elements 112$a$, 112$b$ alternately and intermittently excited by a pair of boosting switch elements 115$a$, 115$b$ from the in-vehicle battery 101, and a common high voltage capacitor 114$a$ charged through a pair of charging diodes 113$a$, 113$b$ from the pair of induction elements 112$a$. 112$b$, when one of the pair of boosting switch elements 115$a$, 115$ab$ is closed, one of the pair of induction elements 112$a$, 112b is excited from the in-vehicle battery 101 and the other of the pair of boosting switch elements 115a, 115b is opened, and when the other of the pair of boosting switch elements 115a, 115b is opened, the electromagnetic energy accumulated in the other of the pair of induction elements 112a, 112b is discharged to charge the common high voltage capacitor 114a.

Thus, according to claim 12 of the present invention, the boosting control circuit portion comprises a common high voltage capacitor to a pair of induction elements, boosting switch elements, and charging diodes, in which the common high voltage capacitor is charged in cooperation with the pair of induction elements alternatively and intermittently being excited.

Therefore, there is a feature that during a period for which one of the induction element is excited from the in-vehicle battery, the other induction element charges the high voltage capacitor, so that the high voltage capacitor is charged immediately without generating a time loss, enabling a high frequency split injection to be performed, and the generated heat is dispersed by the pair of boosting switch elements and the induction elements, thereby reducing each temperature rise.

The switch elements which drives the electromagnetic coil $103i$ (i=1, 2, ... m) comprises a rapid cutoff switch element $123i$ individually connected to each electromagnetic coil $103i$, a rapid excitation switch element $122j$ (j=1) or a parallel switch portion $129j$ thereof and a power feeding-sustaining switch element $121j$ (j=1) or a parallel switch portion $169j$ thereof used for each electromagnetic coil $103i$ of the first cylinder group in common, a rapid excitation switch element $122j$ (j=2) or the parallel switch portion $129j$ and a power feeding-sustaining switch element $121j$ (j=2) or the parallel switch portion $169j$ thereof used for each electromagnetic coil $103i$ of the second cylinder group in common, wherein the rapid excitation switch element $122j$ (j=1, 2) or the parallel switch portion $129j$ thereof applies the boosted high voltage VIh1 from the high voltage capacitor 114a to the upstream side terminal of the electromagnetic coil 103 of the first cylinder group or the second cylinder group to provide a rapid excitation current, during a predetermined time interval immediately after the fuel injection command INJi is generated, the power feeding-sustaining switch element $121j$ or the parallel switch portion $129j$ thereof intermittently applies the power source voltage Vbb of the in-vehicle battery 101 through the backflow prevention element $125j$ (j=1, 2) to the upstream terminal of the electromagnetic coil $103i$ of the first cylinder group or the second cylinder group during a period for which the fuel injection command INJi is generated to provide a valve opening-holding current, so that the valve opening-holding current of the electromagnetic coil 103 following the intermittent operation of the power feeding-sustaining switch element $121j$ or the parallel switch portion $169j$ thereof is commuted and attenuated by the commutation circuit element $126j$ (j=1, 2) for each cylinder group, the rapid cutoff switch element $123i$ connects the downstream side terminal of the electromagnetic coil $103i$ to the ground circuit during a period for which the fuel injection command INJi is generated, and further including a collection diode $160i$ which releases a flyback voltage generated across the terminals of the rapid cutoff switch element $123i$ to the high voltage capacitor 114a when the rapid cutoff switch element $123i$ is opened, so that the maximum voltage variation range before and after the charging of the high voltage capacitor 14a is limited to the power supply voltage Vbb of the in-vehicle battery 101 or less.

Thus, in relation to claim 13 of the present invention, the collection diode is connected to the rapid cutoff switch element which individually cuts off the excitation current of the electromagnetic coil at a high-speed, and when the rapid cutoff switch element is opened, the electromagnetic energy accumulated in the electromagnetic coil is to be regeneratively charged to the high voltage capacitor, so that the variation range before and after the charging of the boosted high voltage is limited to a predetermined value or less.

Therefore, there is a feature that since the electromagnetic energy accumulated in the electromagnetic coil is not absorbed by the rapid cutoff switch element, the consumption power of the rapid cutoff switch element is suppressed, and since the electromagnetic energy regeneratively charged in the high voltage capacitor is used for the next rapid excitation of the magnetic coil, the charging energy of the high voltage capacitor by the boosting control circuit portion can be reduced.

Also, there is a feature that since the voltage variation range of the high voltage capacitor is limited, the current attenuation characteristic of the electromagnetic coil when the rapid cutoff switch element is opened is stabilized, thereby obtaining a stable valve closing characteristic.

While it is disadvantageous in this Embodiment that since the rapid cutoff switch element is connected in series with the power feeding-sustaining switch element and the rapid excitation switch element, the conduction current to the electromagnetic coil flows through two switch elements on the upper stream side and the downstream side, providing large consumed power, when a short circuit fault of the switch element on the upstream side or the downstream side, or a sky fault or a ground fault of external wirings occurs, the conduction current can be cut off by the other switch element.

Embodiment 3

(1) Detailed Description of Arrangement

Hereinafter, the arrangement and the effect will be described referring to FIG. 8 showing the entire circuit block diagram of an in-vehicle engine control apparatus according to Embodiment 3 of the present invention in attention to the difference with the apparatus shown in FIG. 1.

Throughout the figures, the same reference numerals indicate identical or corresponding portions, in which the in-vehicle engine control apparatus 100A is replaced by an in-vehicle engine control apparatus 100C with the alphabet of the capital letter of the reference numeral's tail indicating each embodiment.

In FIG. 8, the first main difference between the apparatus in FIG. 8 and the apparatus in FIG. 1 is that with respect to the four electromagnetic coils 31-34 driving the fuel injection electromagnetic valves, a boosting control circuit portion 110C comprises two induction elements 112a, 112b, two boosting switch elements 115a, 115b intermittently driving the elements 112a, 112b, and a pair of high-voltage capacitors 114a, 114b charged through the pair of charging diodes 113a, 113b, whereby a pair of boosted high voltages Vh1, Vh2 are generated.

Also, the second and third main differences are that the parallel switch element $129j$ is added to the rapid excitation switch element $122j$ in a cooperative connection manner, and they are respectively connected to one and the other of the pair of high pressure capacitors 114a, 114b.

Similarly to the electromagnetic coils 33, 32 of the second group, the power feeding-sustaining switch element 121j, the rapid excitation switch element 122j, and the parallel switch element 129j are connected.

Therefore, each switch element in the drive control circuit portion 120C is assigned one with respect to one electromagnetic coil. This assignment is the same as the rapid cutoff switch element 123i.

The fourth main difference is that the flyback energy of the electromagnetic coil 103i when the rapid cutoff switch element 123i is opened is collected by a mediate capacitor 161j through the collection diode 160i, and this collected energy is to be released to the electromagnetic coil 103i driven next time through discharging diodes 166j, 167j.

The fifth main difference is that the operation control circuit portion 130C uses the average value of the temperatures (as the measured environmental temperature Tx) measured by the low environmental temperature detection element 139a and the high environmental temperature detection element 139c having been described referring to FIG. 6.

In the boosting control circuit portion 110C, the induction element 112a, the boosting switch element 115a, the charging diode 113a, and the high-voltage capacitor 110a are controlled by a feedback control circuit 118a (not shown), forming a first boosting circuit which generates the same boosted high voltage Vh1 as in FIG. 1.

While the high-voltage capacitor 114a has an electrostatic capacity smaller than that in FIG. 1 and so is rapidly charged, the discharged-attenuated voltage Vd as will be described referring to FIG. 10B decreases to a level close to the power supply voltage Vbb.

The induction element 112b, the boosting switch element 115b, the charging diode 113b, and the high-voltage capacitor 114b are controlled by a feedback control circuit 118b (not shown), forming a second boosting circuit which generates the same boosted high voltage Vh2 as in FIG. 1

While the electrostatic capacity of the high-voltage capacitor 114b is small, so that the discharged-attenuated voltage Vd decreases to a level close to the power supply voltage Vbb, the high-voltage capacitor 114a is connected to the rapid excitation switch element 122j through a backflow prevention diode 163a and the high-voltage capacitor 114b is connected to the parallel switch element 129j through a backflow prevention diode 163b, so that the rapid excitation switch element 122j and the parallel switch element 129j are alternately driven to close the circuit.

As a result, a high-frequency split injection can be made by alternately driving the electromagnetic coils 103i to open the valve by the pair of induction elements 112a, 112b and the pair of boosting switch elements 115a, 115b, and the dispersion of the generated heat can be made by the pair of induction elements 112a, 112b and the pair of boosting switch elements 115a, 115b.

In the drive control circuit portion 120C, the gate control circuit 128 alternately generates rapid power feeding gate signals B1, B2, so that the rapid excitation switch element 122j and the parallel switch element 129j are alternately driven to close the circuit.

The backflow prevention diodes 163a, 163b serve to prevent the electric charged in the mediate capacitor 161j from flowing into the high-voltage capacitors 114a, 114b having the voltage decreased when the rapid cutoff switch element 123i is opened, resulting in the valve closing characteristics being varied.

In the operation control circuit portion 130C, the microprocessor CPU is connected to a high environmental temperature detection element 139c provided in the vicinity of the power feeding-sustaining switch element 121j and to the low environmental detection element 139a for measuring the environmental temperature Ta of the elements to be monitored, which is mounted in an area of the circuit substrate 200 of which average temperature of the temperature distribution area is lower than the average temperature related to the temperature distribution within the case 109, the area being not adjacent to a highly heated part including at least the monitored element.

The microprocessor CPU calculates the average value of a high environmental temperature Tc from the high environmental temperature detection element 139c and a low environmental temperature Ta from the low environmental temperature detection element 139a, which is made the measured environmental temperature Tx.

(2) Detailed Explanation of Effect and Operation

Hereinafter, the effect and operation of the in-vehicle engine control apparatus according to Embodiment 3 of the present invention arranged as shown in FIG. 8 will be described in detail based on FIGS. 9A-9H and 10A-10E which are time charts for describing the operation.

In FIGS. 9A-9H which are the first time charts, FIG. 9A shows a logical state of the valve opening command signal according to the fuel injection command INJi for each cylinder, where at time t0 the valve opening command is generated and at time t2 the valve opening command is ended or stopped.

FIG. 9B shows a waveform of the excitation current for the electromagnetic coil 103. At time t0, the power feeding gate signal A, the rapid power feeding gate signal B (B1 or B2), and the conduction gate signal C respectively shown in FIGS. 9E, 9F, and 9G are generated to close the power supply holding element 121j, the rapid excitation switch element 122j, and the parallel switch element 129j, and the rapid cutoff switch element 123i, thereby rapidly increasing the excitation current.

After the excitation current has reached the peak current Ia, at time t1 when it attenuates to the holding power supply finishing current Ib or the discharged-attenuated voltage Vd of the high-voltage capacitors 114a, 114b decreases to a predetermined threshold voltage, the rapid power feeding gate signal B (B1 or B2) shown in FIG. 10F is stopped, thereby opening the rapid excitation switch element 122i or the parallel switch element 129j.

Then, the power feeding gate signal A shown in FIG. 9E is intermittently generated, where the power feeding-sustaining switch element 121j is closed when the excitation current becomes equal to or below the lower limit current Ie of the valve opening-holding current Ih, or is opened when it is equal to or above the upper limit current Id, thereby maintaining the predetermined valve opening-holding current.

At time t2 when the valve opening signal of FIG. 9A is stopped, and the conduction gate signal C of FIG. 9C is accordingly stopped, the rapid cutoff switch element 123i is opened, so that as shown in FIG. 9H the electromagnetic energy accumulated in the electromagnetic coil 103i generates a charging voltage for the mediate capacitor 161j.

FIG. 9C shows a waveform of the boosted high voltage Vh1 or Vh2 which is the terminal voltage of the high-voltage capacitor 114a, 114b. When the electromagnetic coil 103i is driven to open the circuit in a state where the waveform has reached the boosted maximum voltage Vp at the end of the initial charging immediately after the power supply switch is switched on, the waveform decreases to discharged-attenuated voltage Vd. From time t1, the boosting gate signal D1 or D2 shown in FIG. 9D is generated to reopen the intermittent operation of one of the boosting switch elements 115a, 115b, and at time t3 the waveform reaches the boosted maximum voltage Vp again, preparing for the next rapid excitation.

In FIGS. 10A-E that are the second time charts, FIG. 10A shows a logical state of the valve opening command signal according to the fuel injection command INJi for each cylinder, where at time T1 the valve opening command of this time is generated and at time T3 the valve opening command is stopped.

Then at time T4, the valve opening command of next time is generated and at time T7 this valve opening command is stopped.

FIG. 10B shows a waveform of the boosted high voltage Vh1 which is a terminal voltage across the high-voltage capacitor 114a. When the electromagnetic coil 103i is driven to open the circuit at time T1 when the waveform reaches the boosted maximum voltage Vp at the end of the initial charging immediately after the power supply switch is turned on, it decreases to the discharged-attenuated voltage Vd at time T2, the boosting gate signal D1 shown in FIG. 10C is generated from time T2 to reopen the intermittent operation of one of the boosting switch element 115a, and it reaches the boosted maximum voltage Vp again at time T5, preparing for the next rapid excitation.

It is to be noted that the discharged-attenuated voltage Vd never become equal to or lower than the power supply voltage Vbb, so that it is appropriate to adapt a value twice the power supply voltage Vbb as a reference value.

FIG. 10D shows a waveform of the boosted high voltage Vh2 which is the terminal voltage across the high-voltage capacitor 114b. When the electromagnetic coil 103i is driven to open the circuit at time T4 when the waveform has reached the boosted maximum voltage Vp at the end of the initial charging immediately after the power supply switch is switched on, the waveform decreases to the discharged-attenuated voltage Vd at time T6, the boosting gate signal D2 shown in FIG. 10E is generated from time T6, the intermittent operations of the other of the boosting switch element 115b is restarted, and the waveform reaches the boosted maximum voltage Vp again at time T9, preparing for the next rapid excitation.

A waveform F1 shown in FIG. 10B is a voltage waveform of the mediate capacitor 161j charged with the electromagnetic energy accumulated in the electromagnetic coil 103i when the rapid cutoff switch element 123i is opened at time T3, where the initial value of the charging voltage is determined by the discharged-attenuated voltage Vd of the high-voltage capacitors 114a, 114b.

Also, the electric charge of the mediate capacitor 161j charged this time is to be discharged to the electromagnetic coil 103i to be driven next time in cooperation with the high-voltage capacitor 114b shown in FIG. 10D.

Similarly, a waveform F2 shown in FIG. 10D is a voltage waveform of the mediate capacitor 161j charged with the electromagnetic energy accumulated in the electromagnetic coil 103i when the rapid cutoff switch element 123i is opened at time T7, where the initial value of the charging voltage is determined by the discharged-attenuated voltage Vd of the high-voltage capacitors 114a, 114b.

Also, the electric charge of the mediate capacitor 161j charged this time is to be discharged to the electromagnetic coil 103i to be driven next time in cooperation with the high-voltage capacitor 114a shown in FIG. 10B.

Thus, the initial voltage of the mediate capacitor 161j being stabilized indicates that the current attenuation characteristics after the rapid cutoff switch element 123i is opened are stable and so the valve closing characteristics of the fuel injection electromagnetic valve are stable.

(3) Gist and Feature of Embodiment 3

As seen from the above description, an in-vehicle engine control apparatus according to Embodiment 3 of the present invention relates to an in-vehicle engine control apparatus 100C for sequentially driving a fuel injection electromagnetic valve provided for each cylinder i (i=1, 2, ... m) of a multi-cylinder engine, comprising a drive control circuit portion 120C including a plurality of switch elements for alternately and sequentially driving a plurality of electromagnetic coils 103i for driving the electromagnetic valves to be opened, for each of a first cylinder group j (j=1) and a second cylinder group j (j=2), a boosting control circuit portion 10C which generates a boosted high voltage for rapidly exciting the electromagnetic coils 103i, and an operation control circuit portion 130C mainly composed of a microprocessor CPU and a program memory PGM, the boosting control circuit portion 110C comprising a plurality of induction elements 112a, 112b intermittently excited by a plurality of boosting switch elements 115a, 115b from an in-vehicle battery 101, and a plurality of high-voltage capacitors 114a, 114b which are charged to the boosted high voltages Vh1, Vh2 as targets through multiple intermittent operations by the electromagnetic energies accumulated in the induction elements 112a, 112b being discharged when the boosting switch elements 115a, 115b are opened, and the drive control circuit portion 120C comprising a power feeding-sustaining switch element 121j connected for each cylinder group through a backflow prevention element 125j between the in-vehicle battery 101 and the electromagnetic coils 103i, a rapid excitation switch element 122j connected for each cylinder group between the high-voltage capacitor 114a and the electromagnetic coils 103i, a commutation circuit element 126j connected for each cylinder group in parallel with electromagnetic coil 103i, and a rapid cutoff switch element 123i individually connected in series with the electromagnetic coil 103i.

And, the operation control circuit portion 130C includes fuel injection command means 612 which provides a fuel injection command INJi to the switch elements 121j, 122j, and 123i, a control program forming a split upper limit designating means 614 which designates an upper limit value of a selected value Bn for determining how many times the fuel injection command signal INJi should be provided to the same electromagnetic coil 103i during one combustion cycle period of each engine of the multi-cylinder engine, and a reference data 500 which is a data table or an approximated calculation, the reference data 500 is an aggregation of reference data 501-505 respectively related to a plurality of elements to be monitored, in which the reference data 500 includes the selected value Bn as a mediate parameter, restricted by the split upper limit designating means 614, and is composed of minimum values edited of numerical data of allowable engine rotational speed Nk determined by a detected environmental temperature Tx, as a parameter, detected by environmental temperature detection elements 139a, 139c and related to installation environments of the elements to be monitored, representing any of the induction elements 112a, 112b, the boosting switch elements 115a, 115b, the rapid excitation switch element 122j, the power feeding-sustaining switch element 121j, and the rapid cutoff switch element 123i, the allowable engine rotation speed Nk is statistic data obtained by confirming that the internal temperature of the elements to be monitored becomes equal to or less than a predetermined allowable limit temperature Tjmax even in case of a continuous operation with multiple injections by applying the selected value Bn designated to the measured environmental temperature Tx, and the split upper limit designating means 614 determines the selected value Bn having an allowable higher split injection frequency as an upper limit within an allowable range by comparing an engine rotational speed Ne detected by an engine rotation sensor 105e and a value of the allowable engine rotational speed Nk with respect to the measured environmental temperature Tx at present calculated by an interpolation operation from the reference data 500.

The operation control circuit portion 130C, the boosting control circuit portion 110A, and the drive control circuit portion 120A are mounted on a circuit substrate 200 stored in the case 109, the monitored element includes specific monitored elements composed of the induction elements 112a, 112b, the boosting switching elements 115a, 115b, and the rapid excitation switch element 122j which have a temperature rise increasing as the selected value Bn increases, and assuming that the environmental temperature detection element be the low environmental temperature detection element 139a in a temperature distribution area lower than the average temperature related to the thermal distribution within the case 109 and the high environmental temperature detection element 139c arranged adjacent to the power feeding-sustaining switch element 121j inside the drive control circuit portion 120C, the average value of the temperatures detected by the low environmental temperature detection element 139a and the high environmental temperature detection element 139c is made the measured environmental temperature Tx of the specific monitored elements.

Thus, in relation to claim 9 of the present invention, to the environmental temperature of the specific monitored elements which are the induction element, the boosting switch element, and the rapid excitation switch element, the average temperature of the low environmental temperature within the case storing the circuit substrate and the high environmental temperature at a position adjacent to the power feeding-sustaining switch element is applied.

Therefore, there is a feature that the temperature rise value of the highly heated element that is the specific monitored element is approximately determined by the product of the magnitude of the engine rotational speed and the split injection frequency, and by adding this temperature rise value to the measured average environmental temperature the internal temperature of the specific monitored element can be estimated in view of the heated state of the power feeding-sustaining switch element, so that if allowable values of the engine rotational speed making the inside temperature equal to or below a predetermined allowable limit value with the environmental temperature and the split injection frequency given are preliminarily prepared as reference data, the allowable rotational speed can be easily calculated without estimations of internal temperatures at the stage of actual machine operations, whereby the allowable rotational speed is a suppressed one when the power feeding-sustaining switch element is highly heated.

It is designed that the consumed power of the power feeding-sustaining switch element is increased by the split injection frequency, and mainly increased in proportion to the valve opening time of the fuel injection valve, on the basis of the environmental temperature at which the internal temperature becomes a predetermined value or less with respect to a large consumed power at the time of high load/high speed operations.

However, as such a high speed operation with a high split injection frequency continues, the temperature rises of the induction element, the boosting switch element, and the rapid excitation switch element become high, and consequently the environmental temperature of the power feeding-sustaining switch element is increased, so that the power feeding-sustaining switch element will be also influenced by the split injection frequency directly or indirectly.

In contrast, by combining the environmental temperature of the specific monitored elements with the thermal components of the power feeding-sustaining switch element, the split injection frequency can be determined so that the internal temperatures of the specific monitored element and the power feeding-sustaining switch element may become a predetermined value or less.

It is to be noted that while in case of the rapid cutoff switch element of a circuit type absorbing the electromagnetic energy accumulated in the electromagnetic coil with the switch elements upon the conduction cutoff, consumed power in proportion to the product of the split injection frequency and the engine rotational speed is generated, forming one of the elements to be monitored, the one element to be monitored can be removed from the elements to be monitored by preliminarily absorbing the electromagnetic energy upon the conduction cutoff time with the high voltage capacitor or the mediate capacitor.

As seen from the above description, an in-vehicle engine control apparatus according to Embodiment 3 of the present invention relates to an in-vehicle engine control apparatus 100C for sequentially driving a fuel injection electromagnetic valve provided for each cylinder i (i=1, 2, ... m) of a multi-cylinder engine, comprising a drive control circuit portion 120C including a plurality of switch elements for alternately and sequentially driving a plurality of electromagnetic coils 103i for driving the electromagnetic valves to be opened, for each of a first cylinder group j (j=1) and a second cylinder group j (j=2), a boosting control circuit portion 110C which generates a boosted high voltage for rapidly exciting the electromagnetic coils 103i, and an operation control circuit portion 130C mainly composed of a microprocessor CPU and a program memory PGM, the boosting control circuit portion 110C comprising a plurality of induction elements 112a, 112b intermittently excited by a plurality of boosting switch elements 115a, 115b from an in-vehicle battery 101, and a plurality of high-voltage capacitors 114a, 114b which are charged to the boosted high voltages Vh1, Vh2 as targets through multiple intermittent operations by the electromagnetic energies accumulated in the induction elements 112a, 112b being discharged when the boosting switch elements 115a, 115b are opened, and the drive control circuit portion 120C comprising a power feeding-sustaining switch element 121j connected for each cylinder group through a backflow prevention element 125j between the in-vehicle battery 101 and the electromagnetic coils 103i, a rapid excitation switch element 122j connected for each cylinder group between the high-voltage capacitor 114a and the electromagnetic coils 103i, a commutation circuit element 126j connected for each cylinder group in parallel with electromagnetic coil 103i, and a rapid cutoff switch element 123i individually connected in series with the electromagnetic coil 103i.

And, the operation control circuit portion 130C includes a control program forming split upper limit designating means 624 which designates an upper limit of the selected value Bn for determining how many times the fuel injection command signal INJi should be generated to the same electromagnetic coil 103i during one combustion cycle period of each engine of the multi cylinder engine, and a reference data 500 which is a data table or approximated calculation, composed by consolidating experimental data related to a plurality of elements to be monitored, the split upper limit designating means 614 designates the selected value Bn a possible higher split injection frequency as an upper limit on a condition that the internal temperature of the monitored element becomes equal to or less than a predetermined allowable limit value in association with the presently measured environmental temperature Tx detected by the environmental temperature detection elements 139a, 139c, an allowable engine rotational speed Nk calculated from the reference data 500, and the present engine rotational speed Ne detected by the engine rotation sensor 105e, and further including loss suppressing means or generated heat dispersion means which suppresses a temperature rise of at least a part of the switch element provided within the boosting control circuit portion 110C and the drive control circuit portion 120C.

The boosting control circuit portion 110C comprises a pair of induction elements 112a, 112b intermittently excited by a pair of boosting switch elements 115a, 115b from the in-vehicle battery 101, and a pair of high voltage capacitors 114a, 114b charged to the boosted high voltages Vh1, Vh2 as targets through the discharging operation of plural times by the electromagnetic energy accumulated in the induction elements being discharged, and one of the pair of high voltage capacitor 114a, 114b is connected to the electric magnetic coil 103j of the first group or the second group through the rapid excitation switch element 122j, while the other of the high voltage capacitors 114a, 114b is connected to the same electric magnetic coil 103j as the rapid excitation switch element 122j through the parallel switch element 129j, so that the rapid excitation switch element 122j and the parallel switch element 129j are alternately driven to close the circuit.

Thus, in relation to claim 14 of the present invention, by using a plurality of elements of the boosting switch element, the induction element, and the high voltage capacitor provided in the boosting circuit portion, a plurality of high voltage capacitors perform the charging operation to the electromagnetic coils alternately.

Therefore, by the rapid excitation to the electromagnetic coils being shared with the plural elements, the temperature rise of the boosting control circuit portion is suppressed, and a high frequency rapid excitation is made possible by charging one of the elements while discharging the other, so that the split injection frequency to the same electromagnetic coil can be increased.

The switch elements which drive the electromagnetic coils 103i (i=1, 2, . . . m) comprise a rapid cutoff switch element 123i individually connected to each electromagnetic coil 103i, a power feeding-sustaining switch element 121j (j=1) as well as a rapid excitation switch element 122j (j=1) or a parallel switch portion 129j (j=1) thereof used for each electromagnetic coil 103i of the first cylinder group in common, and a power feeding-sustaining switch element 121j (j=2) as well as a rapid excitation switch element 122j (j=2) or a parallel switch portion 129j (J=2) thereof used for each electromagnetic coil 103i of the second cylinder group in common, the rapid excitation switch element 122j (j=1, 2) or the parallel switch element 129j (j=1, 2) applies the boosted high voltages VIh1, Vh2 from one or the other of the pair of high voltage capacitors 114a, 114b to the upstream side terminal of the electromagnetic coil 103 of the first cylinder group or the second cylinder group to provide a rapid excitation current, during a predetermined time interval immediately after the fuel injection command INJi is generated, and the power feeding-sustaining switch element 121j intermittently applies the power source voltage Vbb of the in-vehicle battery 101 through the backflow prevention element 125j (j=1, 2) to the upstream terminal of the electromagnetic coil 103i of the first cylinder group or the second cylinder group during a period for which the fuel injection command INJi is generated, to thereby provide a valve opening-holding current, so that the valve opening-holding current of the electromagnetic coil 103 following the intermittent operation of the power feeding-sustaining switch element 121j is commuted and attenuated by the commutation circuit element 126j (j=1, 2) for each cylinder group.

And, the rapid cutoff switch element 123i connects each downstream side terminal of the electromagnetic coil 103i to the ground circuit during a period for which the fuel injection command INJi is generated, a mediate capacitor 161j (j=1, 2) which absorbs the flyback voltage generated across the terminals of the rapid cutoff switch element 123i when the rapid cutoff switch element 123i is opened through the commutation circuit element 126j and the collection diode 160i respectively provided for the electromagnetic coil 103i, and a pair of discharging diodes 166j, 167j which discharge the charged energy of the mediate capacitor 161j by the electromagnetic coil 103i driven this time to the electromagnetic coil 103i driven next time are further provided, and the rapid excitation switch element 122j or the parallel switch element 129j is to be opened after the terminal voltage of the high voltage capacitors 114a, 114b is decreased to a predetermined threshold value or less which is lower than the value of the duplicate of the power supply voltage Vbb of the in-vehicle battery 101.

Thus, in relation to claim 15 of the present invention, a serial circuit of the collection diode and the mediate capacitor is connected in parallel with the rapid cutoff switch element which individually cuts off the excitation current of the electromagnetic coil at a high-speed, and when the rapid cutoff switch element for rapidly exciting the electromagnetic coil is opened, the electromagnetic energy charged this time by the electromagnetic coil is to be charged to the same electromagnetic coil or the other electromagnetic coil for the other cylinder group, to be supplied with power next time.

Therefore, there is a feature that since the electromagnetic energy accumulated in the electromagnetic coil is not absorbed by the rapid cutoff switch element, the consumed power of the rapid cutoff switch element is suppressed, and since the electromagnetic energy trans-charged to the mediate capacitor is used for the next rapid excitation of the magnetic coil, the charging energy of the high voltage capacitor can be reduced by the boosting control circuit portion.

Also, there is a feature that since the rapid excitation switch element is adapted to be opened when the residual voltage of the mediate capacitor decreases to a predetermined value or less, the current attenuation characteristics of the electromagnetic coil when the rapid cutoff switch element is opened are stabilized, thereby obtaining stable valve closing characteristics.

While it is disadvantageous in this Embodiment that since the rapid cutoff switch element is connected in series with the power feeding-sustaining switch element and the rapid excitation switch element, the conduction current to the electromagnetic coil flows through two switch elements on the upper stream side and the downstream side, providing a large consumed power, when a short circuit fault of the switch element, or a sky fault or ground fault of an external wiring etc. occurs on the upstream side or the downstream side, the conduction current can be cut off by the other switch element.

Embodiment 4

(1) Detailed Explanation of Arrangement and Effect

Hereinafter, the arrangement and the effect will be described in detail referring to FIG. 11 showing the entire circuit block diagram of an in-vehicle engine control apparatus according to Embodiment 4 of the present invention in attention to the difference from the apparatus in FIG. 1.

Through the figures the same reference numerals indicate identical or corresponding portions in which the in-vehicle engine control apparatus 100A is replaced by an in-vehicle engine control apparatus 100D with the alphabet of the capital letter of the reference numeral's tail indicating each embodiment, in which the portion shown by the dotted lines in FIG. 11 forms an modification according to Embodiment 4.

In FIG. 11, the first main difference between the apparatus in FIG. 7 and the apparatus in FIG. 1 is that with respect to each of the four electromagnetic coils 31-34 which drives the fuel injection electromagnetic valves, four power feeding-sustaining switch elements 121$i$, a rapid excitation switch element 122$i$, a backflow prevention element 125$i$, and a commutation circuit element 126$i$ are provided respectively.

The second main difference is that the negative terminals of the four electromagnetic coils 103$i$ (31-34) are connected to the ground circuit, and a rapid cutoff switch element 123$i$ is connected in series with the commutation circuit element 126$i$ to form a parallel connection with each electromagnetic coil 103$i$.

The third main difference is that the four rapid cutoff switch elements 123$i$ comprise a constant voltage diode 124$i$ in the gate circuit to restrict the cutoff voltage of the rapid cutoff switch element 123$i$.

In a drive control circuit portion 120D shown in FIG. 11, one switch element is assigned to each electromagnetic coil, whereby the generated heat is dispersed, normally no current flows through the rapid cutoff switch element 123$i$, and a commutation current flows following the intermittent operation of the power feeding-sustaining switch element 121$i$ when the valve opening-holding current is supplied.

Therefore, the switch element is connected across the upstream side and the lower stream side of the electromagnetic coil 103$i$ in the case of FIG. 1, while the switch element is connected only to the upstream side in the case of FIG. 7, so that consumed power by the switch element can be largely reduced, where when the rapid cutoff switch element 123$i$ is opened, consumed power due to absorbing the electromagnetic energy accumulated in the electromagnetic coil 103$i$ by the rapid cutoff switch element 123$i$ occurs.

It is to be noted that in case of FIG. 11, no negative wiring of the electromagnetic coil 103$i$ becomes necessary, so that the number of wiring terminals can be reduced, and wiring troubles such as a ground fault of the negative wiring and a loose connection of the connector will be reduced.

Next, a modification shown by the dotted lines will be described referring to the time charts in FIGS. 12A-12C.

It is to be noted that in this modification, the electromagnetic energy accumulated in the electromagnetic coil 103$i$ by the rapid cutoff switch element 123$i$ is not absorbed when the rapid cutoff switch element 123$i$ is opened but is absorbed by the mediate capacitor 155$i$ and regenerated to the high-voltage capacitor 114$a$.

Therefore, according to this modification, the constant voltage diode 124$i$ provided in the gate circuit of the rapid cutoff switch element 123$i$ is not necessary but if it is a parasitic diode inside the rapid cutoff switch element 123$i$, which has a withstanding voltage higher than the maximum charging voltage generated at the mediate capacitor 155$i$ may be used.

In FIG. 12A, at time T1 when the fuel injection command INJi of this time is generated, the rapid holding switch element 121$i$, the rapid excitation switch element 122$i$, and the rapid cutoff switch element 123$i$ are closed, and the residual voltage of the high-voltage capacitor 114$a$ decreases to the discharged-attenuated voltage Vd, so that the rapid excitation switch element 122$i$ is opened at time T2.

During a valve opening-holding period from time T2 to time T3 when the fuel injection command INJi is stopped, the power feeding-sustaining switch element 121$i$ makes the intermittent operations, so that the valve opening-holding current Ih shown in FIG. 9B flows through the electromagnetic coil 103$i$.

While in this duration, a commutation current flows through the rapid cutoff switch element 123$i$ when the power feeding-sustaining switch element 121$i$ is intermittently opened, when all of the switch elements, i.e. the power feeding-sustaining switch element 121$i$, the rapid excitation switch element 122$i$, and the rapid cutoff switch element are opened at time T3, the mediate capacitor 155$i$ is charged with the electromagnetic energy accumulated in the electromagnetic coil 103$i$.

Its charging path ranges from the negative terminal of the electromagnetic coil 103$i$ in FIG. 11 through the ground circuit, the second diode 152$i$, the mediate capacitor 155$i$, and the fourth diode 154$i$ to the positive terminal of the electromagnetic coil 103$i$, at which time no current flows in the direction from the second diode 152$i$ to the first diode 151$i$.

A wave form F1 in FIG. 12B shows a voltage waveform of the mediate capacitor 155$i$ charged this time.

At time T4, the fuel injection command INJi of next time is generated and the electromagnetic coil 103 driven thereby is the other electromagnetic coil 103$i$ different in cylinder or the same electromagnetic coil 103$i$ as the last time if the split injection is carried out, which is herein called "electromagnetic coil 103$i$ upon the next injection". At time T4, the power feeding-sustaining switch element 121$i$, the rapid excitation switch element 122$i$, and the rapid cutoff switch element 123$i$ corresponding to the electromagnetic coil 103$i$ upon the next injection are closed and the discharging of the high voltage capacitor 114$a$ and the mediate capacitor 155$i$ is started.

The discharging path of the mediate capacitor 155i forms a circuit from the positive terminal of the in-vehicle battery 101 through the output contact 102 of the power supply relay, the power feeding-sustaining switch element 121i, the third diode 153i, the mediate capacitor 155i, the first diode 151i, and the current limiting register 150i, the rapid excitation switch element 122i to the electromagnetic coil 103i. The discharging path of the high-voltage capacitor 114a forms a circuit from the positive terminal of the high-voltage capacitor 114a through the rapid excitation switch element 122i to the electromagnetic coil 103i.

It is to be noted that the initial voltage of the mediate capacitor 155i has a value of the discharged-attenuated voltage Vd of the high-voltage capacitor 114a minus the power supply voltage Vbb of the in-vehicle battery 101, so that if the discharged-attenuated voltage Vd is preliminarily set to a predetermined value equal to or below the duplicate of the power supply voltage Vbb, the initial voltage may have a small value equal to or below the power supply voltage Vbb.

Therefore, the current attenuation characteristic of the electromagnetic coil 103i when the rapid excitation switch element 122i is opened is stabilized, thereby achieving predetermined valve closing response characteristics.

It is to be noted that as having been described in the embodiments shown in FIGS. 1 and 7, the boosted high voltage Vh1 of the high-voltage capacitor 114a may also be maintained at a high voltage even after the discharging to the electromagnetic coil 103i has been performed.

In the above descriptions through Embodiments 1-4, the heated elements such as the charging diodes 113a, 113b used in the boosting control circuit portions 110A-110D, and the backflow prevention elements 125i, 125j as well as the commutation circuit elements 126i, 126j used in the drive control circuit portions 120A-120D can have a replaced function of diode by using a field effect type transistor in a reverse connection instead of the diodes shown and the voltage drop is greatly reduced, thereby suppressing the heat generation.

(2) Gist and Feature of Embodiment 4

As seen from the above description, an in-vehicle engine control apparatus according to Embodiment 4 of the present invention relates to an in-vehicle engine control apparatus 100D for sequentially driving a fuel injection electromagnetic valve provided for each cylinder i (i=1, 2, ... m) of a multi-cylinder engine, comprising a drive control circuit portion 120D including a plurality of switch elements for alternately and sequentially driving a plurality of electromagnetic coils 103i for driving the electromagnetic valves to be opened, for each of a first cylinder group j (j=1) and a second cylinder group j (j=2), a boosting control circuit portion 110D which generates a boosted high voltage for rapidly exciting the electromagnetic coils 103i, and an operation control circuit portion 130D mainly composed of a microprocessor CPU and a program memory PGM, the boosting control circuit portion 110D comprising one induction element 112a intermittently excited by one boosting switch element 115a from an in-vehicle battery 101, and one high-voltage capacitor 114a which is charged to the boosted high voltage Vh1 as a target through multiple intermittent operations with electromagnetic energy accumulated in the induction element 112a being discharged when the boosting switch element 115a is opened, and the drive control circuit portion 120D comprising a power feeding-sustaining switch element 121j individually connected through a backflow prevention element 125j between the in-vehicle battery 101 and the electromagnetic coils 103i, a rapid excitation switch element 122j individually connected between the high-voltage capacitor 114a and the electromagnetic coils 103i, a commutation circuit element 126j connected for each cylinder group in parallel with electromagnetic coils 103i, and a rapid cutoff switch element 123i individually connected in series with the electromagnetic coil 103i.

And, the operation control circuit portion 130D includes fuel injection command means 612 which provides a fuel injection command INJi to the switch elements 121i-123i, a control program forming split upper limit designating means 614 which designates an upper limit value of a selected value Bn for determining how many times the fuel injection command signal INJi should be provided to the same electromagnetic coil 103i during one combustion cycle period of each engine of the multi-cylinder engine, and a reference data 500 which is a data table or an approximated calculation, the reference data 500 is an aggregation of reference data 501-505 respectively related to a plurality of elements to be monitored, in which the reference data 500 includes the selected value Bn restricted by the split upper limit designating means 614 as a mediate parameter, and is composed of minimum values edited of numerical data of allowable engine rotational speed Nk determined by a detected environmental temperature Tx, as a parameter, detected by an environmental temperature detection element 139b and related to environments of the elements to be monitored are set, representing any of the induction element 112a, the boosting switch element 115a, the rapid excitation switch element 122i, the power feeding-sustaining switch element 121i, and the rapid cutoff switch element 123i, the allowable engine rotation speed Nk is statistic data obtained by confirming through experiments that the internal temperature of the elements to be monitored becomes equal to or less than a predetermined allowable limit temperature Tjmax even in case of a continuous operation with multiple injections by applying the selected value Bn designated to the measured environmental temperature Tx, and the split upper limit designating means 614 determines the selected value Bn having an allowable higher split injection frequency as an upper limit by comparing an engine rotational speed Ne detected by an engine rotation sensor 105e and a value of the allowable engine rotational speed Nk with respect to the measured environmental temperature Tx at present calculated by an interpolation operation from the reference data 500.

The operation control circuit portion 130D, the boosting control circuit portion 110A, and the drive control circuit portion 120D are mounted on a circuit substrate 200 stored in the case 109, the monitored element includes specific monitored elements composed of the induction element 112a, the boosting switching element 115a, and the rapid excitation switch element 122i of which temperature rise increases as the selected value Bn increases, and assuming that the environmental temperature detection element be a low environmental temperature detection element 139a in a temperature distribution area lower than the average temperature related to the thermal distribution within the case 109 and a high environmental temperature detection element 139c arranged adjacent to the power feeding-sustaining switch element 121i within the drive control circuit portion 120A, the detected temperature by an average environmental temperature detection element 139b set at a place having an environmental temperature corresponding to the average value of the temperatures detected by the low environmental temperature detection element 139a and the high environmental temperature detection element 139c is made the measured environmental temperature Tx of the specific monitored element.

Thus, in relation to claim 9 of the present invention, the average temperature of the low environmental temperature within the case storing the circuit substrate and the high environmental temperature at a position adjacent to the power feeding-sustaining switch element is applied to the environmental temperature of the specific monitored elements, i.e. the induction element, the boosting switch element, and the rapid excitation switch element.

Therefore, there is a feature that the temperature rise value of the highly heated element which is the specific monitored element is approximately determined by the product of the magnitude of the engine rotational speed and the split injection frequency, and by adding this temperature rise value to the measured average environmental temperature the internal temperature of the specific monitored element in view of the heated state of the power supply holing switch element is estimated, so that if allowable values of the engine rotational speed making the internal temperature equal to or below a predetermined allowable limit value under the environmental temperature and the split injection frequency given are preliminarily prepared as reference data, the allowable rotational speed can be easily calculated without performing estimations of internal temperatures at the stage of actual machine operations, whereby the allowable rotational speed is a suppressed one when the power feeding-sustaining switch element is highly heated.

It is designed that the consumed power of the power feeding-sustaining switch element is increased by the split injection frequency, mainly increased in proportion to the valve opening time of the fuel injection valve, on the basis of the environmental temperature at which the internal temperature becomes a predetermined value or less with respect to a large consumed power at the time of high load/high speed operation.

However, when such a high speed operation with a high split injection frequency continues, the temperature rise of the induction element, the boosting switch element, and the rapid excitation switch element become high, and consequently the environmental temperature of the power feeding-sustaining switch element is increased, so that the power feeding-sustaining switch element will be also influenced by the split injection frequency directly or indirectly.

In contrast, by combining the environmental temperature of the specific monitored element with the thermal components of the power feeding-sustaining switch element, the split injection frequency can be determined so that the internal temperatures of the specific monitored element and the power feeding-sustaining switch element may become a predetermined value or less.

It is to be noted that while in case of the rapid cutoff switch element of a circuit type absorbing the electromagnetic energy accumulated in the electromagnetic coil with the switch element upon the conduction cutoff, consumed power in proportion to the product of the split injection frequency and the engine rotational speed is generated and forms one of the elements to be monitored, the one element to be monitored can be removed from the elements to be monitored by preliminarily absorbing the electromagnetic energy upon the conduction cutoff time with the high voltage capacitor or the mediate capacitor.

As seen from the above description, an in-vehicle engine control apparatus according to Embodiment 1 of the present invention relates to an in-vehicle engine control apparatus 100D for sequentially driving a fuel injection electromagnetic valve provided for each cylinder i (i=1, 2, . . . m) of a multi-cylinder engine, comprising a drive control circuit portion 120D including a plurality of switch elements for alternately and sequentially driving a plurality of electromagnetic coils 103i for driving the electromagnetic valves to be opened, for each of a first cylinder group j (j=1) and a second cylinder group j (j=2), a boosting control circuit portion 110D which generates a boosted high voltage for rapidly exciting the electromagnetic coils 103i, and an operation control circuit portion 130D mainly composed of a microprocessor CPU and a program memory PGM, the boosting control circuit portion 110D comprising one induction element 112a intermittently excited by one boosting switch element 115a from an in-vehicle battery 101, and one high-voltage capacitor 114a which is charged to the boosted high voltage Vh1 as a target through multiple intermittent operations by electromagnetic energy accumulated in the induction element 112a being discharged when the boosting switch element 115a is opened, and the drive control circuit portion 120D comprising a power feeding-sustaining switch element 121i individually connected through a backflow prevention element 125j between the in-vehicle battery 101 and the electromagnetic coils 103i, a rapid excitation switch element 122i individually connected between the high-voltage capacitor 114a and the electromagnetic coils 103i, a commutation circuit element 126j individually connected in parallel with the electromagnetic coils 103i, and a rapid cutoff switch element 123i individually connected in series with the electromagnetic coil 103i.

And, the operation control circuit portion 130D includes a control program forming split upper limit designating means 624 which designates an upper limit of the selected value Bn for determining how many times the fuel injection command signal INJi should be generated to the same electromagnetic coil 103i during one combustion cycle period of each engine of the multi cylinder engine, and a reference data 500 which is a data table or approximated calculation, composed by consolidating experimental data related to a plurality of elements to be monitored, the split upper limit designating means 614 designates the selected value Bn a possible higher split injection frequency as an upper limit on a condition that the internal temperature of the monitored element becomes equal to or less than a predetermined allowable limit value in association with the presently measured environmental temperature Tx detected by the environmental temperature detection element 139b, an allowable engine rotational speed Nk calculated from the reference data 500, and the present engine rotational speed Ne detected by the engine rotation sensor 105e, and further including loss suppressing means or generated dispersion means for suppressing a temperature rise of at least a part of the switch element provided with the boosting control circuit portion II 0D and the drive control circuit portion 120A.

The plural switch elements which drive the electromagnetic coils 103i (i=1, 2, . . . m) comprise a power feeding-sustaining switch element 121i and a rapid excitation switch element 122i individually connected to the upstream side of the electromagnetic coil 103i, where the downstream side of the electromagnetic coil 103i is directly connected to the ground circuit, the rapid excitation switch element 122*i* applies the boosted high voltage VIh1 from the high voltage capacitor 114*a* to the upstream side terminal of the electromagnetic coil 103*i* to provide a rapid excitation current, during a predetermined time interval immediately after the fuel injection command INJi is generated, the power feeding-sustaining switch element 121*i* intermittently applies the power source voltage Vbb of the in-vehicle battery 101 through the backflow prevention element 125*j* (j=1, 2) to the upstream terminal of the electromagnetic coil 103*i* to provide a valve opening-holding current, during a period for which the fuel injection command INJi is generated, the valve opening-holding current of the electromagnetic coil 103 following the intermittent operations of the power feeding-sustaining switch element 121*i* is commuted and attenuated by the serial circuit of the commutation circuit element 126*i* and the rapid cutoff switch element 123*i*, and when the rapid cutoff switch element 123*i* is opened, the electromagnetic energy accumulated in the electromagnetic coil 103*i* is absorbed by the rapid cutoff switch element 123*i* of which cutoff voltage is limited by the voltage limiting diode 124*i* or released to any of the electromagnetic coils 103*i* driven next time after being temporarily absorbed by the mediate capacitor 155*i*.

Thus, in relation to claim 16 of the present invention, the power feeding-sustaining switch element as well as the backflow prevention element, the rapid cutoff switch element as well as commutation circuit element, and the rapid excitation switch element are individually provided for each of the magnetic coils, and a serial circuit of the rapid cutoff switch element and the commutation circuit element is connected in parallel with the electromagnetic coil, preventing the driving current to the electromagnetic coil from flowing through the rapid cutoff switch element.

Therefore, there is a feature that since the rapid cutoff switch element is not connected in series with the electromagnetic coil, the consumed power when the electromagnetic coil is energized is reduced, and since the downstream side of the electromagnetic coil is connected to the ground circuit, enabling the number of connecting terminals to the drive control circuit to be reduced.

This apparatus is provided with:

a mediate capacitor 155*i* which absorbs the flyback voltage generated across the terminals of the rapid cutoff switch element 123*i* through a second diode 152*i* and a fourth diode 154*i* when the rapid cutoff switch element 123*i* is opened, a third diode 153*i* and a first diode 151*i* provided in a path for discharging the electric charge charged to the mediate capacitor 155*i* through the in-vehicle battery 101, the power feeding-sustaining switch element 121*i*, and the rapid excitation switch element 121*i* when the rapid excitation switch element 122*i*, the power feeding-sustaining switch element 121*i*, and the rapid cutoff switch element 123*i* are closed together, and the discharged-attenuated voltage Vd of the high voltage capacitor 114*a* is decreased to a first predetermined threshold value or less which is lower than a value of duplicate of the power supply voltage Vbb of the in-vehicle battery 101, or the maximum voltage variation range before and after of the discharging of the high voltage capacitor 114*a* is limited to the power supply voltage Vbb or less, so that the discharged-attenuated voltage Vd assumes a value equal to or above a second threshold value.

Thus in relation to claim 17 of the present invention, a serial circuit of the second diode and the fourth diodes as well as the mediate capacitor is connected in parallel with the electromagnetic coil and absorbs the electromagnetic energy when the rapid cutoff switch element is opened, so that when the rapid excitation switch element is closed to rapidly excite the magnetic coil, the discharged energy of the mediate capacitor will be discharged to the electromagnetic coil.

Therefore, there is a feature that since the electromagnetic energy accumulated in the electromagnetic coil is not absorbed by the rapid cutoff switch element, the consumed power of the rapid cutoff switch element is suppressed, and since the electromagnetic energy changed to the mediate capacitor is used for rapidly exciting the electromagnetic coil next time, the charged energy of the high voltage capacitor by the boosting control circuit portion can be reduced.

Also, there is a feature that since the residual voltage of the high voltage capacitor is equal to or below the first threshold value or the second threshold value, the residual voltage of the mediate capacitor when the rapid excitation switch element is opened is stabilized, so that the current attenuation characteristic of the electromagnetic coil when the rapid cutoff switch element is opened is stabilized, thereby achieving stable valve closing characteristics.

What is claimed is:

1. An in-vehicle engine control apparatus for sequentially driving a fuel injection electromagnetic valve provided for each cylinder of a multi-cylinder engine, comprising:

a drive control circuit portion including a plurality of switch elements for alternately and sequentially driving a plurality of electromagnetic coils for driving the electromagnetic valves to be opened, for each of a first cylinder group and a second cylinder group, a boosting control circuit portion which generates a boosted high voltage for rapidly exciting the electromagnetic coils, and an operation control circuit portion comprising a microprocessor and a program memory, wherein the boosting control circuit portion includes one or more induction elements intermittently excited by one or more boosting switch elements from an in-vehicle battery, and one or more high-voltage capacitors charged to a boosted high voltage as a target through multiple intermittent operations by electromagnetic energy accumulated in the induction elements being discharged when the one or more boosting switch elements are opened, the drive control circuit portion includes a power feeding-sustaining switch element connected individually or for each cylinder group through a backflow prevention element between the in-vehicle battery and the electromagnetic coils, a rapid excitation switch element connected individually or for each cylinder group between the high-voltage capacitor and the electromagnetic coils, a commutation circuit element connected individually or for each cylinder group in parallel with the electromagnetic coils, and a rapid cutoff switch element individually connected in series with the electromagnetic coil or the commutation circuit element, the operation control circuit portion further includes fuel injection command means which provides a fuel injection command to the plural switch elements, a control program forming split upper limit designating means which designates an upper limit value of a selected value for designating how many times the fuel injection command signal should be provided to the same electromagnetic coil during one combustion cycle period of each cylinder in the multi-cylinder engine, and a reference data which is a data table or an approximated calculation, the reference data is an aggregation of reference data respectively related to a plurality of elements to be monitored, in which the reference data includes the selected value limited by the split upper limit designating means as a mediate parameter, and is composed of minimum values edited of numerical data of allowable engine rotational speed determined by a detected environmental temperature, as a parameter, detected by an environmental temperature detection element and related to installation environments of the elements to be monitored, representing any of the induction elements, the one or more boosting switch elements, the rapid excitation switch element, the power feeding-sustaining switch element, and the rapid cutoff switch element, the allowable engine rotation speed is statistic data obtained by confirming through experiment that the internal temperature of the elements to be monitored becomes equal to or less than a predetermined allowable limit temperature even in case of a continuous operation with multiple injections by applying the selected value designated to the measured environmental temperature, and the split upper limit designating means determines the selected value having a higher split injection frequency as an upper limit within an allowable range by comparing an engine rotational speed detected by an engine rotation sensor and a value of the allowable engine rotational speed with respect to the measured environmental temperature at present calculated by an interpolation operation from the reference data.

2. The in-vehicle engine control apparatus as claimed in claim 1, wherein the program memory further includes a control program forming minimum selected value application means, and the minimum selected value application means is adapted to designate the selected value of the split injection frequency a minimum selected value when the engine rotational speed detected by the engine rotation sensor is equal to or more than a predetermined threshold rotational speed.

3. The in-vehicle engine control apparatus as claimed in claim 1, wherein the program memory includes a control program forming high environmental temperature determining means, rotation abnormality determining means, and abnormality alarming means, the high environmental temperature determining means generates an environmental abnormality determination signal when the measured environmental temperature detected by an environmental temperature detection element exceeds a predetermined reference environmental temperature, the rotation abnormality determining means generates a rotation abnormality determination signal when the present engine rotational speed exceeds an allowable rotational speed calculated from the reference data although a selected value level of the split injection frequency is set to be low, and the abnormality alarming means generates an abnormality alarming command when an occurrence state of the environmental abnormality determining signal or the rotation abnormality determining signal continues for a predetermined threshold time or longer, thereby at least saving an abnormality occurrence information or stopping multiple injection controls.

4. The in-vehicle engine control apparatus as claimed in claim 1, wherein the program memory further includes a control program forming rise selection delay processing means, and the rise selection delay processing means executes rise processing of a selected value when the engine rotational speed decreases or the measured environmental temperature decreases, so that the split upper limit designating means generates a rise selection command for selecting a larger value as the selected value and if the rise selection command still continues to be generated even after a predetermined threshold time has elapsed.

5. The in-vehicle engine control apparatus as claimed in claim 3, wherein the value of the predetermined threshold time applied in the abnormality alarming means is equal to or more than a thermal time constant related to an internal average temperature of the monitored element, and the thermal time constant is a physical constant corresponding to an elapsed time until a temperature variation of 63% of a temperature variation value $\Delta Tmax$ occurs, when consumed power of the monitored element is rapidly incremented or decremented by a variation value, wherein a temperature increment value at a time when an internal average temperature of the monitored element is increased up to a saturated value is made $+\Delta Tmax$ or a temperature decrement value at a time when an internal average temperature of the monitored element is decreased down to a saturated value is made $-\Delta Tmax$, respectively with respect to the temperature variation value $\Delta Tmax$.

6. The in-vehicle engine control apparatus as claimed in claim 4, wherein the value of the predetermined threshold time applied in the rise selection delay processing means is equal to or more than a thermal time constant related to an internal average temperature of the monitored element, and the thermal time constant is a physical constant corresponding to an elapsed time until a temperature variation of 63% of a temperature variation value $\Delta Tmax$ occurs, when consumed power of the monitored element is rapidly incremented or decremented by a variation value, wherein a temperature increment value at a time when an internal average temperature of the monitored element is increased up to a saturated value is made $+\Delta Tmax$ or a temperature decrement value at a time when an internal average temperature of the monitored element is decreased down to a saturated value is made $-\Delta Tmax$, respectively with respect to the temperature variation value $\Delta Tmax$.

7. The in-vehicle engine control apparatus as claimed in claim 3, wherein an adjacent temperature detection element is arranged at a nearest position of the monitored element, and the program memory further includes a control program forming adjacent temperature determining means, the adjacent temperature detection element serves to estimate an internal average temperature of the monitored element, and a measured adjacent temperature detected by a corresponding adjacent temperature detection element is inputted to the microprocessor, the adjacent temperature determining means generates a high temperature abnormality determining signal when the value of the measured adjacent temperature exceeds a control target value of an internal allowable limit temperature Tjmax of the monitored element minus a predetermined margin, and the abnormality alarming means generates an abnormality alarming command due to the adjacent temperature determining means generating the high temperature abnormality determining signal, thereby at least saving the abnormality occurrence alarm or stopping multiple injection controls.

8. The in-vehicle engine control apparatus as claimed in claim 1, wherein the operation control circuit portion, the boosting circuit portion, and the drive control circuit portion are mounted on the circuit substrate stored in a case, the monitored element includes the induction elements, the boosting switching elements, and the rapid excitation switch element, in which the temperature rise is increased as the selected value is increased, and the environmental temperature detection element is a low environmental temperature detection element which measures an environmental temperature of the monitored element as the measured environmental temperature, which is set outside or inside the case; if it is mounted on the circuit substrate for convenience sake of wiring, it is mounted on the circuit substrate in a temperature distribution area lower than at least the average temperature related to the thermal distribution within the case, the area being not adjacent to a highly heated part including the monitored element.

9. The in-vehicle engine control apparatus as claimed in claim 1, wherein the operation control circuit portion, the boosting control circuit portion, and the drive control circuit portion are mounted on a circuit substrate stored in a case, the monitored element includes specific monitored elements composed of the induction elements, the boosting switching element, and the rapid excitation switch element which have a temperature rise increasing as the selected value is increased, and assuming that the environmental temperature detection element be the low environmental temperature detection element in a temperature distribution area lower than the average temperature related to the thermal distribution within the case and a high environmental temperature detection element arranged adjacent to the power feeding-sustaining switch element inside the drive control circuit portion, an average value of the temperatures detected by the low environmental temperature detection element and the high environmental temperature detection element is calculated and made a measured environmental temperature of the specific monitored elements, or a temperature detected by the average environmental temperature detection element set at a place having an environmental temperature corresponding to an average value of temperatures detected by the low environmental temperature detection element and the high environmental temperature detection element is made the measured environmental temperature of the specific monitored elements.

10. An in-vehicle engine control apparatus for sequentially driving a fuel injection electromagnetic valve provided for each cylinder of a multi-cylinder engine, comprising:

a drive control circuit portion including a plurality of switch elements for alternately and sequentially driving a plurality of electromagnetic coils for driving the electromagnetic valves to be opened, for each of a first cylinder group and a second cylinder group, a boosting control circuit portion which generates a boosted high voltage for rapidly exciting the electromagnetic coils, and an operation control circuit portion comprising a microprocessor and a program memory, wherein the boosting control circuit portion includes one or more induction elements intermittently excited by one or more boosting switch elements from an in-vehicle battery, and one or more high-voltage capacitors charged to a boosted high voltage as a target through multiple intermittent operations by electromagnetic energy accumulated in the induction elements being discharged when the one or more boosting switch elements are opened, the drive control circuit portion includes a power feeding-sustaining switch element connected individually or for each cylinder group through a backflow prevention element between the in-vehicle battery and the electromagnetic coils, a rapid excitation switch element connected individually or for each cylinder group between the high-voltage capacitor and the electromagnetic coils, a commutation circuit element connected individually or for each cylinder group in parallel with the electromagnetic coils, and a rapid cutoff switch element individually connected in series with the electromagnetic coil or the commutation circuit element, the operation control circuit portion further includes a control program forming split upper limit designating means which designates an upper limit value of a selected value for determining how many times the fuel injection command signal should be provided to the same electromagnetic coil during one combustion cycle period of each cylinder in the multi-cylinder engine, and a reference data which is a data table or an approximated calculation, edited by collecting through experiment data related to plural monitored elements, the plural monitored elements including any of the induction elements, the one or more boosting switch elements, the rapid excitation switch element, the power feeding-sustaining switch element, and the rapid cutoff switch element, the split upper limit designating means designates the selected value having a possible higher split injection frequency as an upper limit within an allowable range, on a condition that an internal temperature of the monitored elements becomes equal to or below a predetermined allowable limit value, in association with a measured environmental temperature at present detected by an environmental temperature detection element, an allowable rotational speed of engine calculated from the reference data, and an allowable rotational speed of engine at present detected by an engine rotational speed sensor, and further including loss suppressing means or heat generation dispersing means for suppressing a temperature rise of a part of the switch elements provided within the boosting control circuit and the drive control circuit portion.

11. The in-vehicle engine control apparatus as claimed in claim 10, wherein the plural switch elements which drive the electromagnetic coils include a rapid cutoff switch element individually connected to each electromagnetic coils, a rapid excitation switch element as well as a power feeding-sustaining switch element used for each of the electromagnetic coils of the first cylinder group in common, and a rapid excitation switch element as well as a power feeding-sustaining switch element used for each electromagnetic coil of the second cylinder group in common, the rapid excitation switch element applies the boosted high voltage to the upstream side terminal of the electromagnetic coil of the first cylinder group or the second cylinder group to provide a rapid excitation current during a predetermined time interval immediately after the fuel injection command is generated, the power feeding-sustaining switch element intermittently applies the power source voltage Vbb of the in-vehicle battery through the backflow prevention element to an upstream terminal of the electromagnetic coil of the first cylinder group or the second cylinder group during a period for which the fuel injection command is generated to thereby provide a valve opening-holding current, so that the valve opening-holding current of the electromagnetic coil following the intermittent operation of the power feeding-sustaining switch element is commuted and attenuated by the commutation circuit element, the rapid cutoff switch element connects a downstream side terminal of the electromagnetic coil to a ground circuit during a period for which the fuel injection command is generated, so that when the fuel injection command is released, the energy of the electromagnetic coil is absorbed by the rapid cutoff switch element where a cutoff surge voltage is limited by a voltage limiting diode or absorbed by the high voltage capacitor through a collection diode, and at least one of the power feeding-sustaining switch element and the rapid excitation switch element comprises parallel switch elements driven simultaneously, in which each of the switch elements connected in parallel forms a field effect transistor.

12. The in-vehicle engine control apparatus as claimed in claim 10, wherein the boosting circuit portion comprises a pair of induction elements alternately and intermittently excited by a pair of boosting switch elements from the in-vehicle battery, and a common high voltage capacitor charged through a pair of charging diodes from the pair of induction elements, when one of the pair of boosting switch elements is closed, one of the pair of induction elements is excited from the in-vehicle battery and the other of the pair of boosting switch elements is opened, and when the other of the pair of boosting switch elements is opened, the electromagnetic energy accumulated in the other of the pair of induction elements is discharged to charge the common high voltage capacitor.

13. The in-vehicle engine control apparatus as claimed in claim 10, wherein the switch elements which drive the electromagnetic coils include a rapid cutoff switch element individually connected to each electromagnetic coil, a rapid excitation switch element or a parallel switch portion thereof and a power feeding-sustaining switch element or a parallel switch portion thereof used for each of the electromagnetic coils of the first cylinder group in common, a rapid excitation switch element or the parallel switch portion and a power feeding-sustaining switch element or the parallel switch portion thereof used for each of the electromagnetic coils of the second cylinder group in common, the rapid excitation switch element or the parallel switch portion thereof applies the boosted high voltage from the high voltage capacitor to the upstream side terminal of the electromagnetic coil of the first cylinder group or the second cylinder group to provide a rapid excitation current, during a predetermined time interval immediately after the fuel injection command is generated, the power feeding-sustaining switch element or the parallel switch portion thereof intermittently applies the power source voltage of the in-vehicle battery through the backflow prevention element to the upstream terminal of the electromagnetic coil of the first cylinder group or the second cylinder group during a period for which the fuel injection command is generated to provide a valve opening-holding current, so that the valve opening-holding current of the electromagnetic coils following the intermittent operation of the power feeding-sustaining switch element or the parallel switch portion thereof is commuted and attenuated by the commutation circuit element for each cylinder group, the rapid cutoff switch element connects the downstream side terminal of the electromagnetic coil to the ground circuit during a period for which the fuel injection command is generated, and further including a collection diode which releases a flyback voltage generated across the terminals of the rapid cutoff switch element to the high voltage capacitor when the rapid cutoff switch element is opened, so that the maximum voltage variation range before and after the charging of the high voltage capacitor is limited to the power supply voltage of the in-vehicle battery or less.

14. The in-vehicle engine control apparatus as claimed in claim 10, wherein the boosting control circuit portion comprises a pair of induction elements intermittently excited by a pair of boosting switch elements from the in-vehicle battery, and a pair of high voltage capacitors charged to the boosted high voltages as targets through discharging operation of plural times by electromagnetic energy accumulated in the induction elements being discharged, and one of the pair of high voltage capacitor is connected to the electric magnetic coils of the first group or the second group through the rapid excitation switch element, while the other of the high voltage capacitors is connected to the same electric magnetic coil as the rapid excitation switch element through the parallel switch elements, so that the rapid excitation switch element and the parallel switch elements are alternately driven to close the circuit.

15. The in-vehicle engine control apparatus as claimed in claim 14, wherein the switch elements which drive the electromagnetic coils include a rapid cutoff switch element individually connected to each electromagnetic coil, a power feeding-sustaining switch element as well as a rapid excitation switch element or a parallel switch portion thereof used for each of the electromagnetic coils of the first cylinder group in common, a power feeding-sustaining switch element as well as a rapid excitation switch element or the parallel switch portion used for each of the electromagnetic coils of the second cylinder group in common, the rapid excitation switch element or the parallel switch element applies the boosted high voltages from one or the other of the pair of high voltage capacitors to the upstream side terminal of the electromagnetic coils of the first cylinder group or the second cylinder group to provide a rapid excitation current, during a predetermined time interval immediately after the fuel injection command is generated, the power feeding-sustaining switch element intermittently applies the power source voltage of the in-vehicle battery through the backflow prevention element to the upstream terminal of the electromagnetic coil of the first cylinder group or the second cylinder group during a period for which the fuel injection command is generated, to thereby provide a valve opening-holding current, so that the valve opening-holding current of the electromagnetic coils following the intermittent operation of the power feeding-sustaining switch element is commuted and attenuated by the commutation circuit element for each cylinder group, the rapid cutoff switch element connects each downstream side terminal of the electromagnetic coils to the ground circuit during a period, for which the fuel injection command is generated, a mediate capacitor which absorbs the flyback voltage generated across the terminals of the rapid cutoff switch element when the rapid cutoff switch element is opened through the commutation circuit element and the collection diode respectively provided for the electromagnetic coils, and a pair of discharging diodes which discharge the charged energy of the mediate capacitor by the electromagnetic coil driven this time to the electromagnetic coils driven next time are further provided, and the rapid excitation switch element or the parallel switch element is to be opened after the terminal voltage of the high voltage capacitors is decreased to a predetermined threshold value or less which is lower than a duplicate value of the power supply voltage of the in-vehicle battery.

16. The in-vehicle engine control apparatus as claimed in claim 10, wherein the plural switch elements which drive the electromagnetic coils include a power feeding-sustaining switch element and a rapid excitation switch element individually connected to the upstream side of the electromagnetic coil, where the downstream side of the electromagnetic coils is directly connected to the ground circuit, the rapid excitation switch element applies the boosted high voltage from the high voltage capacitor to the upstream side terminal of the electromagnetic coils to provide a rapid excitation current, during a predetermined time interval immediately after the fuel injection command is generated, the power feeding-sustaining switch element intermittently applies the power source voltage of the in-vehicle battery through the backflow prevention element to the upstream terminal of the electromagnetic coil to provide a valve opening-holding current, during a period for which the fuel injection command is generated, the valve opening-holding current of the electromagnetic coils following the intermittent operations of the power feeding-sustaining switch element is commuted and attenuated by the serial circuit of the commutation circuit element and the rapid cutoff switch element, and when the rapid cutoff switch element is opened, the electromagnetic energy accumulated in the electromagnetic coil is absorbed by the rapid cutoff switch element of which cutoff voltage is limited by the voltage limiting diode or released to any of the electromagnetic coils driven next time after being temporarily absorbed by the mediate capacitor.

17. The in-vehicle engine control apparatus as claimed in claim 16, further including:

a mediate capacitor which absorbs the flyback voltage generated across the terminals of the rapid cutoff switch element through a second diode and a fourth diode when the rapid cutoff switch element is opened, a third diode and a first diode provided in a path for discharging the electric charge charged to the mediate capacitor through the in-vehicle battery, the power feeding-sustaining switch element, and the rapid excitation switch element when the rapid excitation switch element, the power feeding-sustaining switch element, and the rapid cutoff switch element are closed together, and a discharged-attenuated voltage of the high voltage capacitor is decreased to a first predetermined threshold value or less which is lower than a duplicate value of the power supply voltage of the in-vehicle battery, or the maximum voltage variation range before and after of the discharging of the high voltage capacitor is limited to the power supply voltage or less, so that the discharged-attenuated voltage assumes a value equal to or above a second threshold value.

18. The in-vehicle engine control apparatus as claimed in claim 2, wherein the program memory further includes a control program forming rise selection delay processing means, and the rise selection delay processing means executes rise processing of a selected value when the engine rotational speed decreases or the measured environmental temperature decreases, so that the split upper limit designating means generates a rise selection command for selecting a larger value as the selected value and if the rise selection command still continues to be generated even after a predetermined threshold time has elapsed.

19. The in-vehicle engine control apparatus as claimed in claim 18, wherein the value of the predetermined threshold time applied in the rise selection delay processing means is equal to or more than a thermal time constant related to the internal average temperature of the monitored element, and the thermal time constant is a physical constant corresponding to an elapsed time until a temperature variation of 63% of a temperature variation value $\Delta T_{max}$ occurs, when consumed power of the monitored element is rapidly incremented or decremented by a variation value, wherein a temperature increment value at a time when an internal average temperature of the monitored element is increased up to a saturated value is made $+\Delta T_{max}$ or a temperature decrement value at a time when an internal average temperature of the monitored element is decreased down to a saturated value is made $-\Delta T_{max}$, respectively with respect to the temperature variation value $\Delta T_{max}$.

\* \* \* \* \*